(12) United States Patent
Gum et al.

(10) Patent No.: US 11,709,274 B2
(45) Date of Patent: Jul. 25, 2023

(54) DETERMINING CORRECT LOCATION IN THE PRESENCE OF GNSS SPOOFING

(71) Applicant: QUALCOMM Incorporated, San Diego, CA (US)

(72) Inventors: Arnold Jason Gum, San Diego, CA (US); David Tuck, San Juan Capistrano, CA (US)

(73) Assignee: QUALCOMM Incorporated, San Diego, CA (US)

(*) Notice: Subject to any disclaimer, the term of this patent is extended or adjusted under 35 U.S.C. 154(b) by 107 days.

(21) Appl. No.: 17/236,862

(22) Filed: Apr. 21, 2021

(65) Prior Publication Data

US 2021/0333411 A1    Oct. 28, 2021

Related U.S. Application Data

(60) Provisional application No. 63/013,695, filed on Apr. 22, 2020.

(51) Int. Cl.
    *G01S 19/21*    (2010.01)
    *G01S 19/48*    (2010.01)
    (Continued)

(52) U.S. Cl.
    CPC ............ *G01S 19/215* (2013.01); *G01S 19/21* (2013.01); *G01S 19/48* (2013.01); *G01S 19/37* (2013.01);
    (Continued)

(58) Field of Classification Search
    CPC ........ G01S 19/215; G01S 19/21; G01S 19/37; G01S 19/485; G01S 19/48; G01S 19/49;
    (Continued)

(56) References Cited

U.S. PATENT DOCUMENTS 7,623,068 B2 * 11/2009 Powell .................... G01S 19/21
                                                        342/357.29
7,697,919 B1    4/2010 Stratton et al.
                        (Continued)

FOREIGN PATENT DOCUMENTS

CN        105717518 A  *  6/2016   ............ G01S 19/21
EP          3502745 A1     6/2019
WO      WO 2020144679      7/2020

OTHER PUBLICATIONS

Warner J.S., et al., "GPS Spoofing Countermeasures", Internet Citation, Dec. 1, 2003 (Dec. 1, 2003), XP007914429, 8 Pages, Retrieved from the Internet: URL:http://www.homelandsecurity.org/bulletin/dual%20benefit/warner_gps_spoofing.html [retrieved on Aug. 13, 2010] the whole document.

(Continued)

*Primary Examiner* — Chuong P Nguyen
(74) *Attorney, Agent, or Firm* — Qualcomm Incorporated

(57) ABSTRACT

A method of determining a location of a mobile device in the presence of a spoofing signal includes obtaining current position information associated with the mobile device, determining a Global Navigation Satellite System (GNSS) signal search window for acquiring GNSS signals associated with a satellite based on the current position information, searching a GNSS signal associated with the satellite based on the GNSS signal search window, and determining updated position information of the mobile device based on at least information of the GNSS signal associated with the satellite.

47 Claims, 14 Drawing Sheets

(51) Int. Cl.
*G01S 19/49* (2010.01)
*H04W 12/122* (2021.01)
*G01S 19/37* (2010.01)
*H04L 9/40* (2022.01)

(52) U.S. Cl.
CPC ............. *G01S 19/485* (2020.05); *G01S 19/49* (2013.01); *H04L 63/1425* (2013.01); *H04L 63/1466* (2013.01); *H04W 12/122* (2021.01)

(58) Field of Classification Search
CPC ........... H04L 63/1425; H04L 63/1466; H04W 12/122
USPC .............. 342/357.59, 357.77, 357.31, 357.32
See application file for complete search history.

(56) References Cited

U.S. PATENT DOCUMENTS

| | | | | |
|---|---|---|---|---|
| 7,764,224 | B1 | 7/2010 | Anderson | |
| 7,800,533 | B2* | 9/2010 | Harper | G01S 19/215 342/357.58 |
| 8,325,087 | B2* | 12/2012 | Thomson | G01S 19/215 342/357.43 |
| 8,531,332 | B2* | 9/2013 | Gum | G01S 19/215 342/357.73 |
| 10,162,061 | B2* | 12/2018 | Kim | G01S 19/215 |
| 10,908,293 | B2* | 2/2021 | Whitehead | G01S 19/55 |
| 2010/0117884 | A1 | 5/2010 | Ahmed et al. | |
| 2010/0117899 | A1 | 5/2010 | Papadimitratos et al. | |
| 2011/0102259 | A1 | 5/2011 | Ledvina et al. | |
| 2012/0026037 | A1 | 2/2012 | Thomson et al. | |
| 2013/0251150 | A1 | 9/2013 | Chassagne | |
| 2014/0247186 | A1* | 9/2014 | Daneshmand | G01S 19/215 342/357.59 |
| 2015/0226857 | A1 | 8/2015 | Davies | |
| 2016/0154113 | A1 | 6/2016 | Leibner et al. | |
| 2017/0070971 | A1* | 3/2017 | Wietfeldt | H04W 24/10 |
| 2017/0215045 | A1 | 7/2017 | Rasal et al. | |
| 2017/0285171 | A1 | 10/2017 | Ries | |
| 2019/0154839 | A1 | 5/2019 | Ashjaee | |
| 2019/0265364 | A1 | 8/2019 | Chae et al. | |
| 2020/0371247 | A1* | 11/2020 | Marmet | G01S 19/254 |
| 2021/0333410 | A1* | 10/2021 | Gum | G01S 19/49 |
| 2021/0405213 | A1* | 12/2021 | Tuck | G01S 19/396 |
| 2022/0221587 | A1* | 7/2022 | Tuck | G01S 19/215 |

OTHER PUBLICATIONS

Wen H., et al., "Countermeasures for GPS Signal Spoofing", GNSS 2005—Proceedings of the 18th International Technical Meeting of the Satellite Division of the Institute of Navigation (ION GNSS 2005), The Institute of Navigation, 8551 Rixlew Lane Suite 360 Manassas, VA 20109, USA, Sep. 16, 2005 (Sep. 16, 2005), pp. 1285-1290, XP056009681, the Whole Document, 6 Pages.

Jeong S., "GNSS Spoofing Detection Using a Maximum Likelihood-Based Sliding Window Method", PLOS One, Research Article, vol. 15, No. 8, Aug. 28, 2020, p. 1-17, e0237146, https://doiorg/10.1371/journal.pone.0237146.

Manfredini, E.G., "Signal Processing Techniques for GNSS Anti-Spoofing Algorithms", Porto Institutional Repository, Doctoral Dissertation, Doctoral Program in Electronics Engineering (29th Cycle), May 2017, 232 Pages, http://porto.polito.it/2672749/.

International Search Report and Written Opinion—PCT/US2021/028462—ISA/EPO—dated Jun. 9, 2022.

Partial International Search Report—PCT/US2021/028462—ISA/EPO—dated Feb. 10, 2022.

* cited by examiner

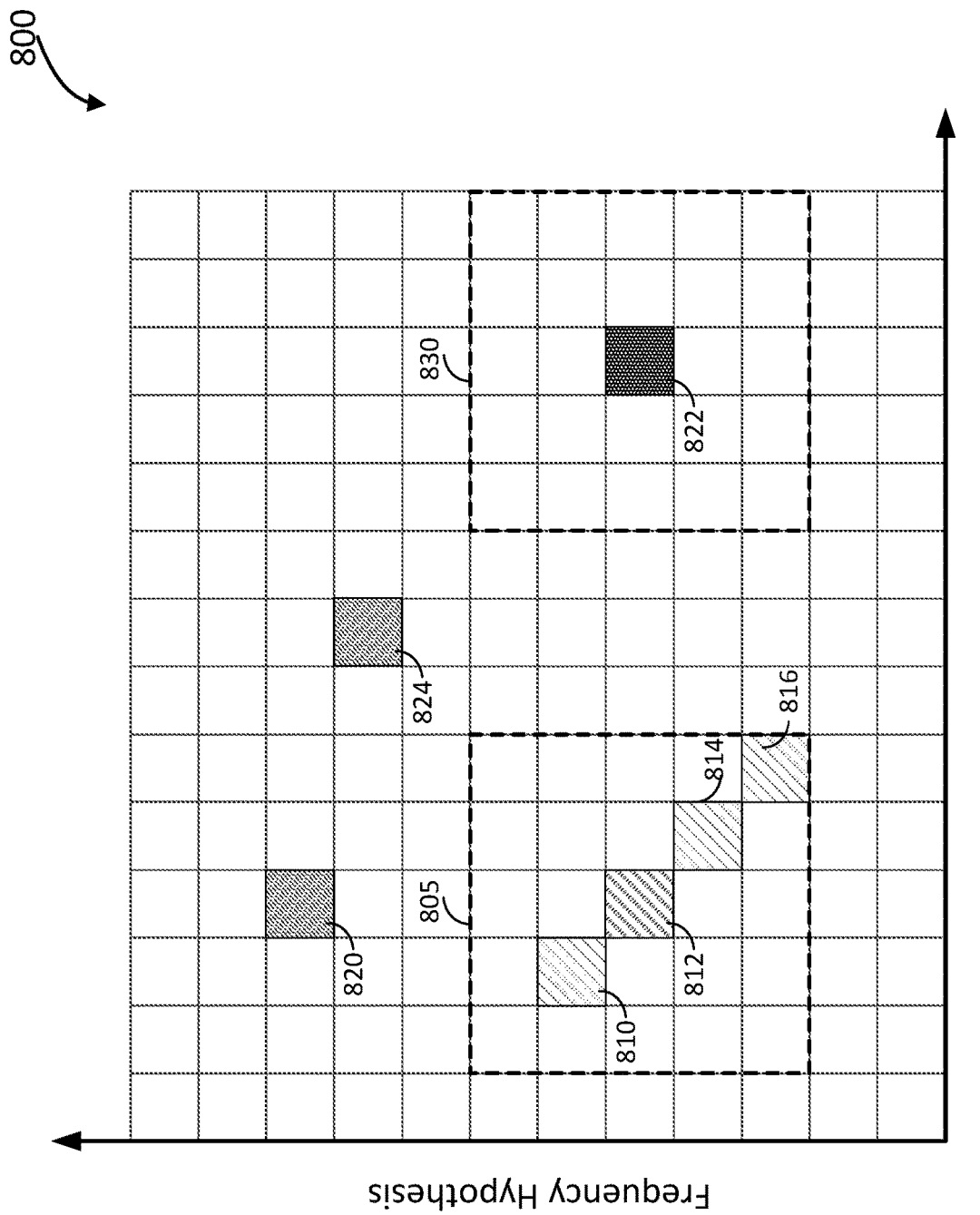

DETERMINING CORRECT LOCATION IN THE PRESENCE OF GNSS SPOOFING

RELATED APPLICATIONS

This application claims the benefit of U.S. Provisional Application No. 63/013,695, filed Apr. 22, 2020, entitled "SPS SPOOFING DETECTION", which is assigned to the assignee hereof, and incorporated herein in its entirety by reference.

BACKGROUND

Obtaining reliable, accurate locations of mobile devices or systems can be useful for many applications, such as emergency handling, personal navigation, autonomous driving, asset tracking, locating a friend or family member, and the like. Existing positioning methods include methods based on measuring radio signals transmitted from a variety of devices or entities including Satellite Vehicles (SVs) and terrestrial radio sources in a wireless network such as base stations and access points. For example, modern electronic devices frequently include systems that can receive signals from satellite navigation systems, commonly referred to as Global Navigation Satellite Systems (each a "GNSS"), and use the satellite signals to determine the location of the devices and other information, such as speed, heading, altitude, and the like. GNSS receivers may be integrated into consumer electronic devices, such as smartphones or smartwatches, as well as into navigation systems in various types of vehicles, such as cars, trucks, ships, aircraft, and drones. Signals from multiple satellites orbiting the Earth may be received and processed by the GNSS receivers to determine the location of the GNSS receiver and, by proxy, the location of the device, vehicle, and the like.

SUMMARY

Various inventive embodiments for determining the location of a mobile device or mobile system using GNSS signals are described herein, including devices, systems, components, apparatuses, methods, procedures, instructions, code, computer storage medium, and the like.

An example method of determining a mobile device location resistant to Global Navigation Satellite System (GNSS) spoofing, according to this disclosure, comprises determining a non-GNSS position of the mobile device based on position information from one or more non-GNSS data sources receiving, at the mobile device, a first GNSS signal. The method also comprises determining, for a predicted frequency and a predicted code phase based on the non-GNSS position, that the first GNSS signal comprises: a frequency that differs from the predicted frequency by more than a threshold frequency difference, a code phase that differs from the predicted code phase by more than a threshold code phase difference, or both. The method also comprises receiving a second GNSS signal within a search window based on the non-GNSS position, the threshold frequency difference, and the threshold code phase difference. The method also comprises determining a measurement for the second GNSS signal.

An example mobile device for determining a location resistant to Global Navigation Satellite System (GNSS) spoofing, according to this disclosure, comprises an antenna configured to receive GNSS signals, a memory, and one or more processing units communicatively coupled with the antenna and the memory. The one or more processing units are configured to: determine a non-GNSS position of the mobile device based on position information from one or more non-GNSS data sources. The one or more processing units are further configured to receive, via the antenna, a first GNSS signal. The one or more processing units are further configured to determine, for a predicted frequency and a predicted code phase based on the non-GNSS position, that the first GNSS signal comprises: a frequency that differs from the predicted frequency by more than a threshold frequency difference, a code phase that differs from the predicted code phase by more than a threshold code phase difference, or both. The one or more processing units are further configured to receive, via the antenna, a second GNSS signal within a search window based on the non-GNSS position, the threshold frequency difference, and the threshold code phase difference. The one or more processing units are further configured to determine a measurement for the second GNSS signal.

An example apparatus for determining a mobile device location resistant to Global Navigation Satellite System (GNSS) spoofing, according to this disclosure, comprises means for determining a non-GNSS position of the mobile device based on position information from one or more non-GNSS data sources. The apparatus further comprises means for receiving, at the mobile device, a first GNSS signal. The apparatus further comprises means for determining, for a predicted frequency and a predicted code phase based on the non-GNSS position, that the first GNSS signal comprises a frequency that differs from the predicted frequency by more than a threshold frequency difference, a code phase that differs from the predicted code phase by more than a threshold code phase difference, or both. The apparatus further comprises means for receiving a second GNSS signal within a search window based on the non-GNSS position, the threshold frequency difference, and the threshold code phase difference. The apparatus further comprises means for determining a measurement for the second GNSS signal.

An example non-transitory computer-readable medium, according to this d disclosure, stores instructions for determining a mobile device location resistant to Global Navigation Satellite System (GNSS) spoofing. The instructions comprise code for determining a non-GNSS position of the mobile device based on position information from one or more non-GNSS data sources. The instructions further comprise code for receiving a first GNSS signal. The instructions further comprise code for determining, for a predicted frequency and a predicted code phase based on the non-GNSS position, that the first GNSS signal comprises a frequency that differs from the predicted frequency by more than a threshold frequency difference, a code phase that differs from the predicted code phase by more than a threshold code phase difference, or both. The instructions further comprise code for receiving a second GNSS signal within a search window based on the non-GNSS position, the threshold frequency difference, and the threshold code phase difference. The instructions further comprise code for determining a measurement for the second GNSS signal.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures.

FIG. 8 is a diagram illustrating an example of tracking GNSS signals using a propagated search window according to certain embodiments.

Figure 1:
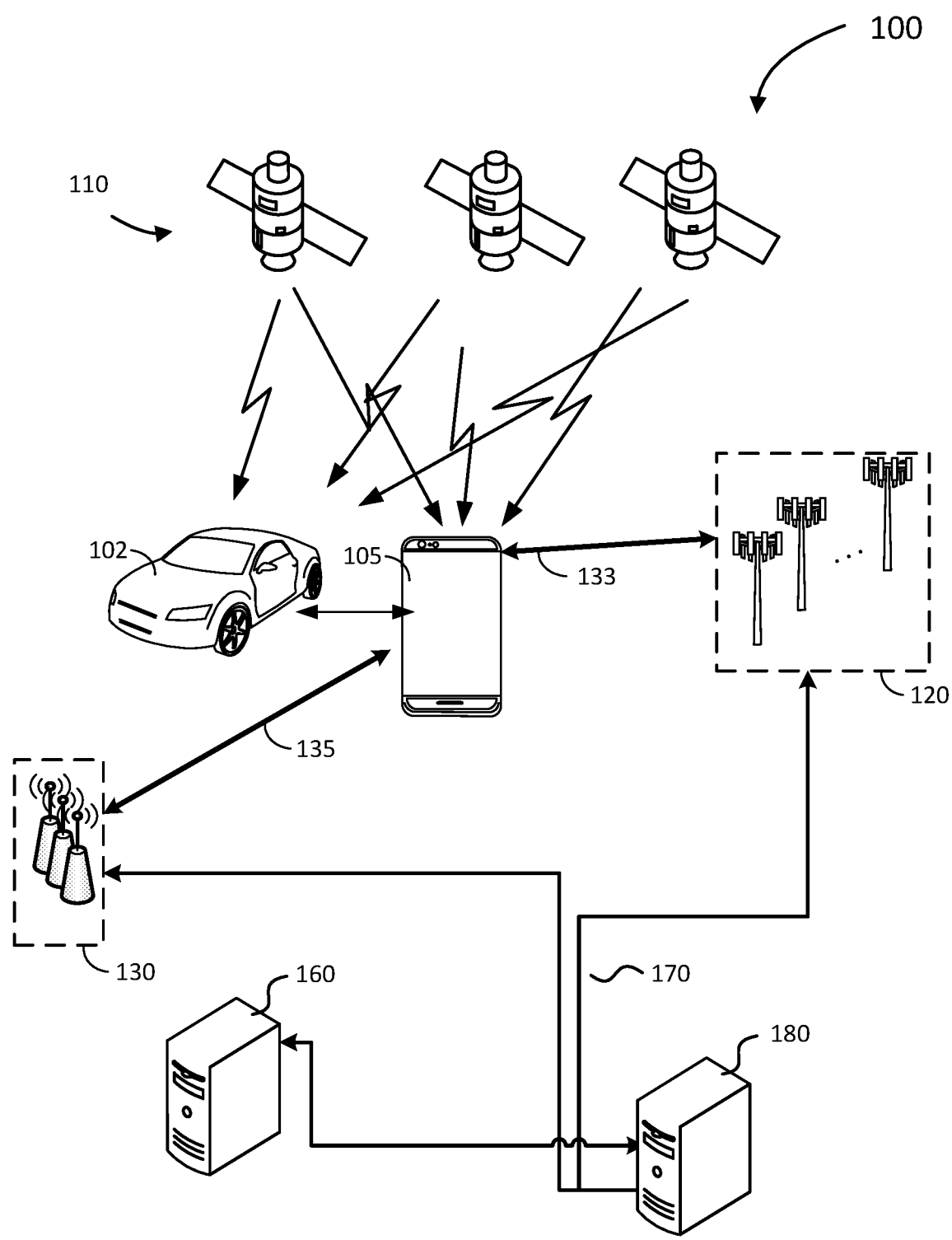
FIG. 1 is a simplified diagram of an example of a positioning system according to certain embodiments.

In the figures, like reference numerals refer to like parts throughout various figures unless otherwise specified. In addition, multiple instances of a component may be distinguished by following the reference numeral by a second label (e.g., a letter or a number), or a dash and a second label. If only the first reference label is used in the specification, the description is applicable to any one of the similar components having the same first reference numeral irrespective of the second label.

DETAILED DESCRIPTION

Techniques disclosed herein relate generally to determining the location of a mobile device or mobile system, and more specifically, to determining the location of a mobile device or mobile system using Global Navigation Satellite System (GNSS) signals in the presence of spoofing signals. Various inventive embodiments are described herein, including devices, systems, components, apparatuses, methods, procedures, instructions, codes, computer-readable storage medium, and the like.

More and more users around the world are relying on mobile navigation services because knowing the location of a moving object, such as a mobile device or system, can be very useful for many applications and/or in many circumstances, such as emergency calls, personal navigation, autonomous driving, asset tracking, locating a person, and the like. Determining an incorrect location of a mobile device can have significant consequences. An incorrect location of the mobile device may be erroneously determined based on erroneous or inaccurate input information, such as incorrect or inaccurate GNSS or Satellite Positioning System (SPS) signals that may be unintentional (e.g., due to SV errors) or intentional (e.g., due to an entity providing one or more spoofing signals). A spoofing signal is a signal that appears to be from a particular source (e.g., a known, trusted source), but is actually from a different source. For example, Global Positioning System (GPS) is a GNSS system in which signals include open signals without any encryption and thus are vulnerable to spoofing attacks where adversaries can inject falsified GPS signals to control a victim's GPS device. For example, a spoofed signal may have characteristics of a signal from a GPS SV but may actually originate from a GLONASS (or GLO) SV or an SPS simulator (e.g., a terrestrial-based SPS signal generator). A spoofing device or system (referred to herein as a "spoofer") may rebroadcast GNSS signals recorded at another place or time (referred to as meaconing) or may generate and transmit modified satellite signals. Since most navigation systems are designed to use the strongest GNSS signals for positioning, spoofing signals may generally be strong signals that can override the weaker but legitimate satellite signals. Identifying spoofing signals or other anomalous signals (i.e., signals that are unexpected, spoofed, or otherwise inaccurate or incorrect) may help a GNSS receiver mitigate the consequences of receiving such signals.

According to certain embodiments, a GNSS receiver and/or a processing unit may identify spoofing signals using various techniques, obtain current position information associated with the mobile device, and determine a GNSS signal search window (e.g., a more narrow or tight) for acquiring and/or tracking GNSS signals associated with a satellite based on the current position information such that the spoofing signals may be excluded from the search window. The current position may comprise a non-GNSS position based on position information from one or more non-GNSS data sources. The search window may define frequency and code phase ranges for GNSS signals, and, as described in more detail herein, may be implemented using different types of GNSS signal tracking techniques, such as grid-based tracking and/or loop-based tracking, which are described in more detail herein. The GNSS receiver may then search for a GNSS signal associated with the satellite using the GNSS signal search window to determine updated position information of the mobile device based on at least information (e.g., frequency and code phase offset) of the GNSS signal associated with the satellite.

As used herein, the term "tracking" when used in the context of a GNSS receiver (and/or components thereof) "tracking" a signal may refer to a mode (e.g., "tracking mode") in which the GNSS receiver, after having identified a GNSS signal, tracks changes in the signal (e.g., changes in frequency and/or code phase) across time. This enables a GNSS receiver to continue to receive the tracked signal across time (using a non-spoofed signal, for example, for position estimation). A GNSS receiver tracking a signal may also be referred to herein as having "locked on" to the signal. Prior to tracking a signal, a GNSS receiver may first search for and acquire a signal. Details regarding signal acquisition and tracking are provided herein, although embodiments are not limited to these disclosed techniques.

As used herein, the terms "user equipment" (UE) and "base station" are not intended to be specific or otherwise limited to any particular radio access technology (RAT), unless otherwise noted. In general, a mobile device and/or UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (or UT), a "mobile device," a "mobile terminal," a "mobile station," or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), and the like. In NR systems, the term "cell" and next generation NodeB (gNB), new radio base station (NR BS), 5G NB, access point (AP), or transmission reception point (TRP) may be used interchangeably. A base station may be used primarily to support wireless access by UEs, including supporting data, voice, and/or signaling connections for the supported UEs. In some systems, a base station may provide purely edge node signaling functions, while in other systems, a based station may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein, the term traffic channel (TCH) can refer to either an uplink/reverse or downlink/forward traffic channel.

In some embodiments, the term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency range that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

A "space vehicle" or "SV," as referred to herein, relates to an object that is capable of transmitting signals to receivers on the earth's surface. In one particular example, such a SV may comprise a geostationary satellite. Alternatively, a SV may comprise a satellite traveling in an orbit and moving relative to a stationary position on the earth. However, these are merely examples of SVs and claimed subject matter is not limited in these respects.

A "location," as referred to herein, relates to information associated with a whereabouts of an object or thing according to a point of reference. For example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects. A "location" is also referred to herein as a "location estimate", "estimated location", "location", "position", "position estimate", "position fix", "estimated position", "location fix", or "fix".

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified diagram of an example of a positioning system 100, according to certain embodiments, in which spoofing may occur and the techniques herein for determining correct location may be performed. In positioning system 100, a UE 105, location server 160, and/or other components of positioning system 100 can use techniques provided herein for determining an estimated location of UE 105. An estimated location of UE 105 can be used in a variety of applications, such as to assist direction finding or navigation for a user of UE 105 or to assist another user (e.g., associated with external client 180) to locate UE 105. A location of UE 105 may include an absolute location of UE 105 (e.g., a latitude and longitude and possibly altitude) or a relative location of UE 105, such as a location expressed as distances north or south, east or west and possibly above or below some other known fixed locations or some other locations such as a location for UE 105 at some known previous time. A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., a 95% confidence level).

In this example, FIG. 1 illustrates UE 105 as a smartphone device. However, UEs may be any suitable device that includes GNSS capabilities, or may be a device or machine with such GNSS functionality integrated into it. For example, UE 105 may include personal devices such as a smartphone, smartwatch, tablet, laptop, and the like. However, UEs may include a larger class of device as well and may include vehicles with integrated GNSS receivers and positioning systems, such as boats, ships, cars, trucks, aircraft, drones, and the like.

Techniques described herein may be implemented by one or more components of positioning system 100. Positioning system 100 can include a vehicle 102, UE 105, one or more satellites 110 (also referred to as SVs) of a GNSS constellation such as GPS, base stations 120, access points (APs) 130, a location server 160, a network 170, and an external client 180. UE 105 can be connected to vehicle 102 or integrated into vehicle 102. In general, positioning system 100 can estimate location of UE 105 based on RF signals received by and/or sent from UE 105 and known locations of other components (e.g., GNSS satellites 110, base stations 120, or APs 130) transmitting and/or receiving the RF signals. Additional details regarding particular location estimation techniques are discussed in more detail below.

FIG. 1 provides a generalized illustration of various components, any or all of which may be utilized as appropriate, and each of which may be duplicated as needed. Specifically, although only one UE 105 is illustrated, it will be understood that many UEs (e.g., hundreds, thousands, millions, etc.) may utilize positioning system 100. Similarly, positioning system 100 may include a larger or smaller number of base stations 120 and/or APs 130 than illustrated in FIG. 1. The illustrated connections that connect the various components in positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, external client 180 may be directly connected to location server 160. A person of ordinary skill in the art will recognize many modifications to the components illustrated.

Depending on the desired functionality, network 170 may include any of a variety of wireless and/or wireline networks. Network 170 can include, for example, any combination of public and/or private networks, local and/or wide-area networks, and the like. Furthermore, network 170 may utilize one or more wired and/or wireless communication technologies. In some embodiments, network 170 may include, for example, a cellular or other mobile network, a wireless local area network (WLAN), a wireless wide-area network (WWAN), and/or the Internet. Examples of network 170 include an LTE wireless network, 5G NR wireless network, a Wi-Fi WLAN, and the Internet. LTE, 5G and NR are wireless technologies defined, or being defined, by the 3rd Generation Partnership Project (3GPP). As used herein, the terms "5G NR," "5G," and "NR" are used interchangeably to refer to these wireless technologies. Network 170 may also include more than one network and/or more than one type of network.

Base stations 120 and access points (APs) 130 are communicatively coupled to network 170. In some embodiments, base station 120s may be owned, maintained, and/or operated by a cellular network provider, and may employ any of a variety of wireless technologies, as described herein below. Depending on the technology of network 170, base station 120 may include a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5G CN) in the case that Network 170 is a 5G network. An AP 130 may include, for example, a Wi-Fi AP or a Bluetooth® AP. Thus, UE 105 can send and receive information with network-connected devices, such as location server 160, by accessing network 170 via base station 120 using a first communication link 133. Additionally or alternatively, because APs 130 may also be communicatively coupled with network 170, UE 105 may communicate with Internet-connected devices, including location server 160, using a second communication link 135.

Location server 160 may comprise a server and/or another computing device configured to determine an estimated location of UE 105 and/or provide data (e.g., "assistance data") to UE 105 to facilitate the location determination. According to some embodiments, location server 160 may include a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, location server 160 may include a Discovered SLP (D-SLP) or an Emergency SLP (E-SLP). Location server 160 may alternatively include an Enhanced Serving Mobile Location Center (E-SMLC) that supports location of UE 105 using a control plane (CP) location solution for LTE radio access by UE 105. Location server 160 may further include a Location Management Function (LMF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In the UP location solution, signaling to control and manage the location of UE 105 may be exchanged between location server 160 and UE 105 as data (e.g., data transported using the Internet Protocol (IP) and/or Transmission Control Protocol (TCP)) from the perspective of network 170.

As described above (and discussed in more detail below), the estimated location of UE 105 may be based on measurements of RF signals sent from and/or received by the UE 105. In particular, these measurements can provide information regarding the relative distance and/or angle of UE 105 from one or more components in positioning system 100 (e.g., GNSS satellites 110, APs 130, and base stations 120). The location of UE 105 can be estimated geometrically (e.g., using multi-angulation and/or multi-lateration techniques) based on the distance and/or angle measurements, along with the known position of the one or more components.

Although terrestrial components such as APs 130 and base stations 120 may be fixed, embodiments are not so limited. In some embodiments, mobile components may be used. Moreover, in some embodiments, the location of UE 105 may be estimated at least in part based on measurements of RF signals communicated between UE 105 and one or more other UEs (not shown in FIG. 1), which may be mobile or stationary. Direct communication between UEs in this manner may comprise sidelink and/or similar Device-to-Device (D2D) communication technologies. Sidelink, which is defined by 3GPP, is a form of D2D communication under the cellular-based LTE and NR standards.

External client 180 may be a web server or remote application that may have some association with UE 105 (e.g., may be accessed by a user of UE 105), or may be a server, application, or computer system providing a location service to some other users, which may include obtaining and providing the location of UE 105 (e.g., to enable a service such as friend or relative finder, asset tracking or child or pet location). Additionally or alternatively, external client 180 may obtain and provide the location of UE 105 to an emergency service provider, government agency, and the like.

A GNSS as referred to herein relates to an SPS comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. A SV which is a member of a particular GNSS constellation typically transmits navigation signals in a format that is unique to the particular GNSS constellation. A GNSS receiver (e.g., in UE 105) may be used to determine both the absolute location and the relative location of UE 105. The GNSS receiver may include, for example, a receiver that can receive broadcast signals from GNSS satellites, such as satellites for GPS (United States), Galileo (European Union), GLONASS (Russia), Compass, Quasi-Zenith Satellite System (QZSS) over Japan, Indian Regional Navigational Satellite System (IRNSS) over India, Beidou (or BDS) over China, or the like. The GNSS receiver may determine the absolute position and velocity of UE 105 by processing the signals broadcasted by satellites. Because the satellites are always in motion, the GNSS receiver may continuously acquire and track the signals from the satellites in view, and compute its distance to a set of satellites based on the speed of the electromagnetic wave (e.g., speed of light) and the propagation time (e.g., time-of-flight) of the incoming signals travelling through space that may be determined using the satellite and receiver local clocks.

The GNSS receiver may receive GNSS signals broadcasted by three or more GNSS satellites 110. GNSS satellites 110 may orbit at altitudes, for example, around 20,000 km to about 23,000 km, and may have very accurate known time and ephemerides. GNSS satellites 110 may broadcast GNSS signals that include pseudorandom codes. The GNSS signals may include carrier frequencies in the L-band, such as 1575.42 MHz (L1), 1227.6 MHz (L2), or 1176.45 MHz (L5) modulated at about 1 MHz and/or about 10 MHz. For example, the L1 GPS signals may include a navigation message, a coarse acquisition (C/A) code that is freely available to the public, and an encrypted precision (P) code or P(Y) code (restricted access). P(Y) code is used exclusively by authorized U.S. military receivers and C/A code is not encrypted for general civilian access. The navigation message may be a low bit-rate (e.g., about 50 bps) message that includes, for example, GPS date and time, satellite status and health, satellite ephemeris data (which allows the receiver to calculate the satellite's position), and almanac that includes information and status (e.g., coarse orbit and status information) for all GPS satellites such that GPS receivers know which satellites are available for tracking. GNSS signals may pass through the near-vacuum space and various layers of atmosphere to the earth and received by the GNSS receiver. In some embodiments, satellite assistance information may be downloaded from a server for determining, in conjunction with received signals, the GNSS receiver's location relative to the satellites and, based on the known location of each satellite, the GNSS receiver's (and thus UE 105's) location on earth.

The GNSS receiver may generally track three or more (e.g., four or more) satellites that are in the line of sight of the GNSS receiver antenna and have a small dilution of precision (DOP) to receive GNSS signals from the satellites. For each satellite tracked, the GNSS receiver may determine the propagation time of a pseudorandom code that includes, for example, 1023 or more bits. GNSS receivers using code-based techniques may correlate or align with the pseudorandom noise (PRN) codes broadcast by satellites to determine its time and position. The GNSS receiver may know the PRN code for each satellite, and thus can determine the time it receives the code from a particular satellite to determine the time of propagation. The time of propagation may be multiplied with the speed of light in free space to calculate the distance between the GNSS receiver and the particular satellite, which may be referred to as a "pseudorange" because the calculated distance may include errors (e.g., clock errors of the GNSS receiver and other errors) and may not be exactly equal to the actual range. Using a positioning technique, such as the trilateration technique, the satellite ephemeris data, and the calculated distance between the GNSS receiver and each of three or more satellites, a GNSS receiver may determine the location of the GNSS receiver as the intersection point of three or more spheres. Because the relatively large clock errors of the GNSS receiver, the three or more spheres may not intersect at a single point. The GNSS receiver may adjust its own clock to determine the time of flight and the pseudoranges, until the three or more spheres approximately intersect at a single point, which indicates the measured location of the GNSS receiver.

There may be many errors associated with a GNSS-based position system. For example, the atomic clocks in the GNSS satellites are very accurate, but they may still drift a small amount, and thus may cause an error of, for example, about ±2 meters. Like the satellite clock, the satellite orbit may also vary a small amount, and thus may cause an error of, for example, about ±2.5 meters. To achieve a better accuracy, the GNSS receiver may need to compensate for the clock error and the orbit error of a satellite. For example, some GNSS receivers may use carrier-based techniques, such as Real Time Kinematic (RTK) and Precise Point Positioning (PPP) techniques, that measure the phase of the carrier wave. Because the carrier wave for the GNSS signal is a sine wave with a period of less than one meter (e.g., about 19 cm for L1 carrier signal), a much more precise measurement of the time of flight may be achieved using the carrier-based techniques. In some positioning system, the GNSS receiver may download correction data from, for example, a Satellite Based Augmentation System (SBAS) or PPP service satellite, or a differential GNSS or RTK base station, to further improve the accuracy of the positioning.

For example, in SBAS systems, reference stations that are geographically distributed throughout the SBAS service area may receive GNSS signals and forward them to a master station. Since the locations of the reference stations are accurately known, the master station can accurately calculate wide-area correction data. The calculated correction data can be uploaded to an SBAS satellite, which may broadcast the correction data to GNSS receivers in the SBAS coverage area. The PPP technique also use correction data broadcasted from satellites. In addition, the PPP technique uses carrier-based ranging to achieve a better accuracy.

In a differential GNSS (DGNSS) system, the position of a fixed GNSS receiver (referred to as a base station) may be determined to a high degree of accuracy, and the base station may compare the known high accuracy position to the position calculated using GNSS signals. Differences between the two positions can be attributed to satellite ephemeris and clock errors, and errors associated with atmospheric delay. The base station may send these calculated errors to other GNSS receivers (e.g., rovers or vehicle-borne GNSS receivers), which may use the calculated errors to make corrections to the position calculations. The RTK technique also removes errors common to a base station and a rover. In addition, the RTK technique uses carrier-based ranging to achieve a better accuracy.

GNSS signals may only propagate in a straight line in a vacuum or through a perfectly homogeneous medium, and may bend as they pass through the earth's atmosphere. The layer of the earth's atmosphere that influences the transmission of GPS (and other GNSS) signals the most is the ionosphere layer, a layer about 70 to about 1,000 km above the earth's surface and including ionized gas molecules and free electrons generated by, for example, ultraviolet rays from the sun. The ionosphere layer may delay the satellite signals and can cause a significant amount of satellite position error, such as ±5 meters. The ionospheric delay may vary with solar activity, time of year, season, time of day, location, and the like, and thus may be difficult to predict. The ionospheric delay may also be frequency dependent, and thus may be determined and eliminated by calculating the range using both L1 and L2 signals. The ionospheric conditions may be similar within a local area such that a base station and rover receivers may experience similar ionospheric delay. As such, the ionospheric delay may be compensated for using, for example, differential GNSS or RTK systems.

Another layer of the earth's atmosphere that may influence the transmission of GNSS signals is the troposphere layer, the lowest layer of the Earth's atmosphere. The delay caused by the troposphere layer may be a function of local temperature, pressure, relative humidity, and the like. L1 and L2 signals may be equally delayed by the troposphere, and thus the effect of tropospheric delay may not be eliminated using GNSS signals in multiple frequencies. The troposphere may be modeled to predict and compensate for much of the tropospheric delay. Since the tropospheric conditions are generally similar within a local area, a base station and nearby rover receivers may experience similar tropospheric delay, which may be compensated for in differential GNSS or RTK systems.

Portions of the GNSS signals transmitted by the satellites may be reflected on the way to the GNSS receiver, such as by a building. This phenomenon is referred to as multipath propagation. The reflected signals travel longer distances and thus are delayed from the direct signals, and may interfere with the direct signals if the reflected signals are sufficiently strong. The delayed signals can cause the receiver to calculate an incorrect position. Multipath errors may be difficult to handle because they are generally local errors that may not be similarly experienced by base stations. Techniques have been developed where the receiver may only consider the earliest-arriving (or the strongest) signals and ignore the multipath signals that arrive later. In some cases, expensive high-end GNSS receivers and antennas may be needed to reduce long-delay multipath errors and short-delay multipath errors.

Location of vehicle 102 may also be determined in a similar way as UE 105. In addition, vehicle 102 and/or UE 105 may include other devices and sensors for positioning. These sensors may include, for example, cameras, ultrasonic sensors, radar sensors (e.g., short- and long-range radars), one or more LIght Detection And Ranging (LIDAR) sensors, a motion sensor or an Inertial Measurement Unit (IMU) (e.g., an accelerometer and/or a gyroscope), a wheel sensor (e.g., a steering angle sensor or rotation sensor), and the like. Each of these sensors may generate signals that provide information relating to vehicle 102 (or UE 105) and/or the surrounding environment. Each of the sensors may send and/or receive signals (e.g., signals broadcast into the surrounding environment and signals returned from the surrounding environment) that can be processed to determine attributes of features (e.g., objects) in the surrounding environment.

The cameras may be used to provide visual information relating to the vehicle 102 and/or its surroundings, for example, for parking assistance, street sign and/or traffic sign recognition, pedestrian detection, lane markings detection and lane departure warning, surround view, and the like. Two or more cameras may also be used to determine a distance of an environmental feature (e.g., a building or a landmark) based on the positions of the two or more cameras and their view angles of the environmental feature. The cameras may include a wide-angle lens, such as a fisheye lens that can provide a large (e.g., larger than 150°) angle of view. Multiple cameras may provide multiple views that can be stitched together to form an aggregated view. For example, images from cameras located at each side of vehicle 102 can be stitched together to form a 360-degree view of the vehicle and/or its surrounding environment. In certain embodiments, the 360-degree view may be provided from an overhead perspective, such as a perspective looking down on the vehicle at a 45-degree angle.

An array of ultrasonic sensors may be located on the front bumper of vehicle 102. In some embodiments, vehicle 102 may include ultrasonic sensors on the driver side, the passenger side, and/or the rear bumper of vehicle 102. The ultrasonic sensors may emit ultrasonic waves that can be used by a vehicle control system to detect objects (e.g., people, structures, and/or other vehicles) in the surrounding environment. In some embodiments, the vehicle control system may also use the ultrasonic waves to determine speeds, positions (including distances), and/or other attributes of the objects relative to vehicle 102. The ultrasonic sensors may also be used, for example, for parking assistance.

The radar sensors may emit radio frequency waves that can be used by the vehicle control system to detect objects (e.g., people, structures, and/or other vehicles) in the surrounding environment. In some embodiments, the vehicle control system may use the radio frequency waves to determine speeds, positions (including distances), and/or other attributes of the objects. The radar sensor may be located at a corner of the front bumper or on the front fascia of the vehicle. Some radar sensors may be installed on the rear portions of vehicle 102. The radar sensors may include long-range radars, medium-range radars, and/or short-range radars, and may be used, for example, for blind spot detection, rear collision warning, cross traffic alert, adaptive cruise control, and the like.

LIDAR sensors may emit infrared laser light that can be used by the vehicle control system to detect objects (e.g., people, structures, and/or other vehicles) in the surrounding environment, for example, for emergency braking, pedestrian detection, or collision avoidance. In some embodiments, the vehicle control system may use the infrared laser light to determine speeds, positions (including distances), and/or other attributes of the objects. The LIDAR sensor may be located on, for example, a top or bottom portion of vehicle 102.

IMUs may measure the speed, linear acceleration or deceleration, angular acceleration or deceleration, or other parameters related to the motion of vehicle 102. Wheel sensors may include, for example, a steering angle sensor that measures the steering wheel position angle and rate of turn, a rotary speed sensor that measures wheel rotation speed, or another wheel speed sensor.

In some embodiments, vehicle data, such as wheel ticks, forward/reverse signals, steering wheel angles, and other data generated by the sensors described above, may be utilized to improve the accuracy of the GNSS-based position system, such as during GNSS signal outage or weakness or in an environment with spoofing or other anomalous signals. For example, a sensor fusion module of a vehicle may use a dead reckoning technique to fuse IMU data, vehicle data, or other sensor data, and previously determined location of a vehicle (e.g., corrected position data) to estimate position information of the vehicle when the GNSS signal is weak, unavailable, or noisy (due to noise and interference). IMU data may include the velocity and/or acceleration information of the vehicle, and thus may be used to determine the displacement of the vehicle at a particular time instant based on laws and equations of motion.

Dead reckoning is a process of calculating a current position by using a previously determined position (or position fix), and advancing (propagating) that position based upon known or estimated speeds over elapsed time and course. Dead reckoning may be implemented in some high-end navigation systems in order to overcome the limitations of GNSS technology. Satellite signals may be unavailable in, for example, buildings, parking garages, and tunnels, and are often severely degraded in urban canyons and near trees due to blocked lines of sight to the satellites or multipath propagation. In a dead reckoning navigation system, a vehicle may be equipped with, for example, sensors that know the wheel circumference and can record wheel rotations and steering direction. These sensors are often already present in vehicles for other purposes (e.g., anti-lock braking system, electronic stability control, etc.) and can be read by the navigation system from the controller-area network (CAN) bus. The navigation system then uses, for example, a Kalman filter to integrate sensor data with the more accurate but occasionally unavailable position information from the GNSS receiver into a combined position fix. A Kalman filter may perform a recursive two-stage process that includes a prediction stage and an update (or correction) stage. The prediction stage may make estimations of the current state and uncertainties by projecting forward the prior state and uncertainties to obtain an a priori estimation of the current state and uncertainties, and the update stage may make an update to the a priori estimation based on the current measurement to obtain an improved a posteriori estimation.

As described above, each satellite in GPS system may transmit a PRN code that includes, for example, 1023 or more bits. The PRN code may be unique to each satellite. For each satellite tracked, the GNSS receiver may determine the propagation time of the PRN code. The GNSS receiver may know the PRN code for each satellite at a given time, and may generate an electronic replica with the GNSS receiver's own clock. The GNSS receiver may then compare the replica signal with the received GNSS signal. Since the GNSS signal was actually created in the satellite some time previously (e.g., about 0.07 seconds earlier, due to the speed of light), the receiver's replica signal needs be delayed in order to match the incoming signal with the replica signal. This time delay represents the time for the signal to propagate from the satellite to the receiver, and errors in the satellite clock and the receiver clock.

In some embodiments, the time delay can be determined by autocorrelation. In the autocorrelation, the first bit from the incoming signal is multiplied by the first bit of the replica signal. For example, if the first bits from the two signals both have values −1, then the result is $(-1)\times(-1)=+1$. Similarly, if both bits have values +1, then the result is +1. On the other hand, if the two bits disagree, the result is $(+1)\times(-1)=-1$. This process is repeated for the second pair of bits, and so on. The result can be written as a sequence of +1 (where the bits agree) and −1 (where the bits disagree). This sequence is then summed, and divided by the total number of bits in each signal. For example, if signal A includes (+1, −1, −1, +1, −1), and signal B includes (+1, +1, −1, −1, +1), then the multiplication gives (+1, −1, +1, −1, −1), the sum of which gives −1, and dividing the sum by the number of bits (5) gives −0.2. If the two signals matched perfectly, the result would be +1. When the two signals include pseudorandom patterns and are not properly matched in time, the result of the autocorrelation may be close to zero. If the two signals are aligned in time, the result is close to +1 (but not exactly, since a real signal also has noise, and thus some bits are incorrect). In general, the larger the number of bits that are compared, the better the resolution. The autocorrelation function may have a shape of an equilateral triangle with a value of 1 at its peak (if no noise), which may be used to find the time displacement that maximizes the autocorrelation.

A GNSS receiver may, during a GPS signal acquisition process, identify satellites that are visible to the receiver, and provide the measurement of the Doppler shift in carrier frequency and the delay in the C/A code of the incoming GPS signal. The Doppler shift in the carrier frequency of GPS signal may be caused by the relative velocity of satellite with respect to the receiver. Satellites in the GNSS system move in rapid orbits around the earth, where the orbits may be different for different constellations (low earth orbit, medium earth orbit, coverage, etc.). Thus, while a satellite may transmit at a starting frequency $f_0$, there is a Doppler shift associated with the satellite signal received at the GNSS receiver. This shift is largely due to the motion of the satellite ($\Delta f_{sat}$) and may also be caused by the movement of the receiver, ($\Delta f_{receiver}$). Thus, the GNSS receiver may detect the satellite signal at $f_0 + \Delta f_{sat} + \Delta f_{receiver}$. The C/A code phase offset is due to the transit time of the satellite signal from the satellite to the GNSS receiver. Within a given satellite band, for example, L1 for GPS, each satellite generally transmits at the same frequency but uses orthogonal coding such that different satellite signals may be detected and respective pseudoranges may be determined at the baseband. In contrast, GLONASS satellites share the same coding but use different sub-bands for the satellite signals.

Acquisition is generally performed by synchronizing the locally generated C/A code and carrier with the received signals. The acquisition is usually performed on a block of data received from the satellite signal, such as the period of C/A code (e.g., 1 ms). A GNSS receiver may find satellite signals from different satellites in a search space by estimating the Doppler frequency and code-delay of each signal. After identifying the available satellites and acquiring the parameters, parallel channels may be used to track the identified satellites. In some embodiments, in each channel, tracking loops are used to extract the navigational data. In tracking loops, C/A code and carrier are removed by refining the code phase and Doppler frequency.

Figure 2A:
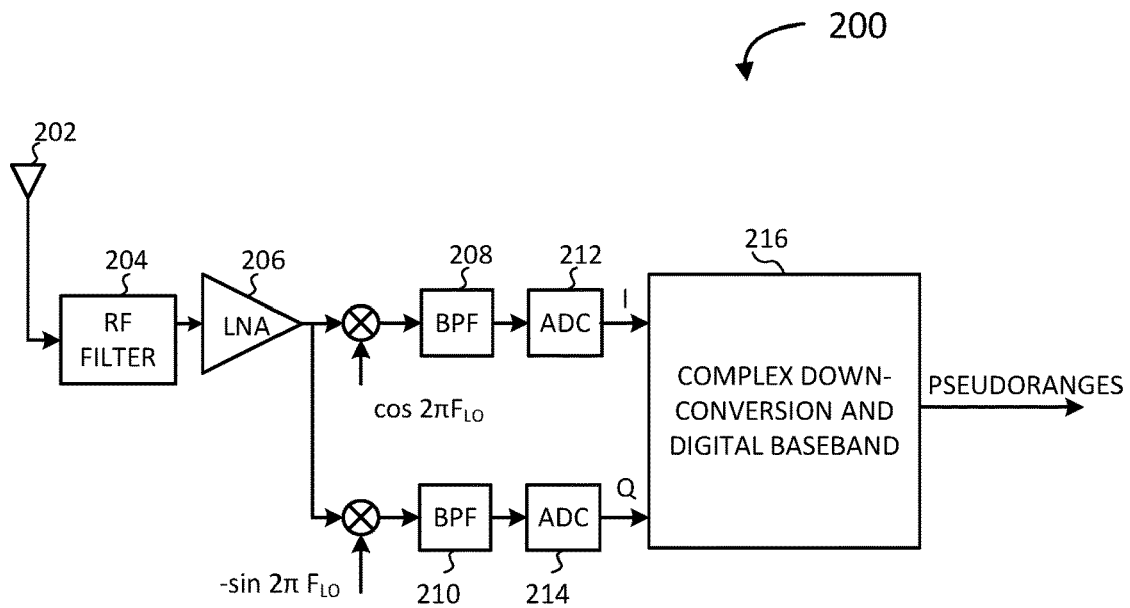
FIG. 2A illustrates a simplified block diagram of an example GNSS receiver, according to an embodiment.

FIG. 2A illustrates a simplified block diagram of an example signal processing architecture 200 that may be used in a GNSS receiver to implement GNSS signal acquisition and tracking (including grid-based tracking and loop-based tracking, as described in further detail hereafter). This signal processing architecture 200 may be implemented in hardware and/or software components of a GNSS receiver, such as the GNSS receiver 1180 of FIG. 11 and/or GNSS receiver 1280 of FIG. 12, which are described in more detail hereafter. The signal processing architecture 200 processes two GNSS signals, $GNSS_1$ and $GNSS_2$, by mixing the received signals with a local oscillator (LO) signal having a frequency $F_{LO}$ that is determined based, at least in part, on first and second carrier frequencies $f_1$ and $f_2$. As shown in FIG. 2A according to a particular implementation, signal processing architecture 200 may receive signals $GNSS_1$ and $GNSS_2$ at a single radio frequency (RF) antenna 202, a bandpass RF filter such as surface acoustic wave (SAW) filter 204 and low-noise amplifier 206. The received GNSS signals may then be complexly downconverted to intermediate frequencies by mixing the received signals with the LO signal as shown.

In this context, a "downconversion" may relate to transforming an input signal having a first frequency characteristic to an output signal having second frequency characteristic. In one particular implementation, although claimed subject matter is not limited in this respect, such a downconversion may comprise transformation of a first signal to a second signal, where the second signal has a frequency characteristic of a lower frequency than that of the first signal. Here, in particular examples, such a downconversion may comprise transformation of a radio frequency (RF) signal to an intermediate frequency (IF) signal, or transformation of an IF signal to a baseband signal and/or baseband information. However, these are merely examples of a downconversion and claimed subject matter is not limited in this respect.

In a particular implementation, by selecting $F_{LO}$ at about a midpoint between $f_1$ and $f_2$, portions of signals downconverted from spectra 202 and 204 may substantially covered by bandpass filters 208 and 210. Here, for example, a selection of a particular frequency for $F_{LO}$ may result in an image frequency component of one downconverted GNSS signal that may substantially overlapping a desired signal component of another downconverted GNSS signal. In particular embodiments, impacts of such overlapping can be avoided without attenuating image frequency components before mixing with LO. It should be understood, however, that in other implementations $F_{LO}$ may be selected to be somewhere other than about a midpoint between $f_1$ and $f_2$, and claimed subject matter is not limited in this respect.

In-phase (I) and quadrature (Q) components filtered by associated BPFs 208 and 210 may then be digitally sampled at analog to digital conversion circuits (ADCs) 212 and 214 to provide digitally sampled in-phase and quadrature components for further processing (e.g., acquisition and/or tracking as described herein). Here, ADCs 212 and 214 may be adapted to sample output signals of BPFs 208 and 210 at or above the Nyquist rate of the combined signal. Also, the presently illustrated implementation includes ADCs 212 and 214 between first and second downconversion stages. It should be understood, however, that other architectures may be implemented without deviating from claimed subject matter. In other implementations, for example, analog to digital conversion may occur following a second downconversion. Again, these are merely example implementations and claimed subject matter is not limited in these respects.

Also, in alternative implementations, ADCs 212 and 214 may be replaced with a single complex ADC or with a single time shared and/or multiplexed ADC with appropriate delays to be shared between in-phase and quadrature signal paths.

In particular implementations, $GNSS_1$ and/or $GNSS_2$ may comprise any one of several pairs of different GNSS signals. In one particular embodiment, although claimed subject matter is not limited in this respect, $GNSS_1$ and $GNSS_2$ may be selected such that $f_1$ and $f_2$ are near in frequency to enable low cost manufacture of SAW 204 and/or LNA 206 by limiting an operating band. While $GNSS_1$ and $GNSS_2$ may be selected such that $f_1$ and $f_2$ are near in frequency (e.g., both being in an L1 band or both being in an L2 band) as illustrated above in particular embodiments, claimed subject matter is not limited in this respect. In alternative embodiments, GNSS signals transmitted at more greatly separated carrier frequencies may be downconverted to a common intermediate frequency in a single receiver channel as illustrated above. In one particular example, an SV in a GNSS constellation may transmit multiple GNSS signals at different carrier frequencies and/or frequency bands such as, for example, L1 and L2 frequency bands.

In particular embodiments, the bandwidth of BPFs 208 and 210 may be centered at about a common intermediate frequency $IF_o$ to process portions of GNSS signals received from both $GNSS_1$ and $GNSS_2$. In addition, the bandwidth of BPFs 208 and 210 may be implemented to be wide enough to capture enough information GNSS signals received from both $GNSS_1$ and $GNSS_2$ without introducing significant noise outside the bands of spectra 202 and 204. Additionally, BPFs 208 and 210 may be chosen to be narrow enough to enable sampling by ADCs 212 and 214 at a given sample rate (e.g., at about the Nyquist rate) without significant distortion.

According to particular implementations, sampled in-phase and quadrature components provided by ADCs 212 and 214 may be further processed according to a complex downconversion and digital baseband 216, which can be used to generate in-phase and quadrature components, and output pseudoranges derived from the GNSS signals. According to some embodiments, the output of the complex downconversion and digital baseband 216 may more broadly be referred to as a measurement, where the measurement may comprise a pseudorange, or a pseudorange and carrier phase.

Figure 2B:
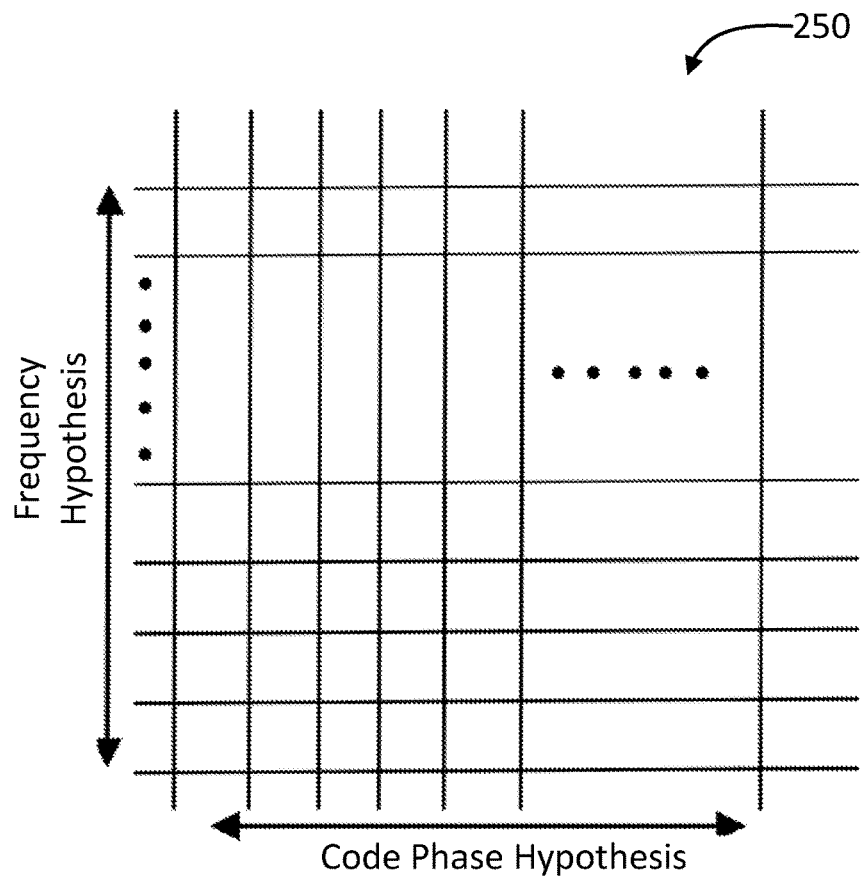
FIG. 2B illustrates an example of a search grid 210 for satellite signal acquisition.

FIG. 2B illustrates an example of a two-dimensional search grid 250 that may be used, according to some embodiments, for satellite signal acquisition. One axis of search grid 250 is the carrier frequency hypothesis with different Doppler shifts, and the other axis of search grid 250 is the code phase hypothesis (or code/time delay). The search grid 250 is generally known as a search window, although, as described hereafter, the dimensions of this search window can be narrowed to reduce the search space. In each search step, the Doppler shift (and thus the frequency of the locally generated carrier) and the delay of the locally generated PRN code may be set according to a date point of the search grid. The received signal from the RF front-end may then be processed using the Doppler shift and the code phase offset as described above with respect to FIG. 2A. In many embodiments, the integrated result is greater than the threshold, the frequency of the locally generated carrier signal and the code phase offset may be handed over to a tracking unit/algorithm for further processing. (However, as noted below, embodiments may perform verification to determine whether this is a spoofing signal.) When the GNSS receiver is in tracking mode, the time frequency search window may be known fairly accurately, and the satellite can be tracked with the search window moved accordingly as the satellite moves, causing the Doppler shift to vary accordingly. If the integrated result is smaller than the threshold, the frequency of the locally generated carrier and/or the delay of the locally generated PRN code may be adjusted based on another data point in the search grid, until they match the frequency and code phase offset of the received signal, thereby producing an integrated result greater than the threshold.

GNSS receivers generally have some stored information that can help in speeding up the process of acquiring satellite signals. When a GNSS receiver is turned on, it may retrieve the last computed position, time, the almanac, and the like. If this information is accurate enough, the receiver may calculate the approximate Doppler frequencies of all visible satellites such that the receiver may not need to search in the entire frequency plane of the search space or may quickly find the carrier (referred to as a warm start). For example, if a mobile device has time and an approximate location, the location the GNSS satellites may be determined relative to the mobile device. Moreover, because the location, heading, and velocity of each GNSS satellite can be determined based on, for example, the ephemeris and/or the almanac, the Doppler offset can be determined for each satellite based on the motion of the satellite. Similarly, the motion of the receiver can be accounted for relative to the satellite in determining the Doppler shift experienced by each satellite signal, and thus the time and frequency window to look for a given satellite signal.

In cold start or non-tracking mode, a GNSS receiver may need to search for Doppler frequencies and satellites in a larger time-frequency search space to correlate against the known codes of satellites that are expected to be visible within a range of frequencies determined based on the satellite assistance information and the predicted orbits of the visible satellites. The receiver may then select, for example, the strongest integration peak, based on integration of the signal against the known satellite codes over time.

Figure 3:
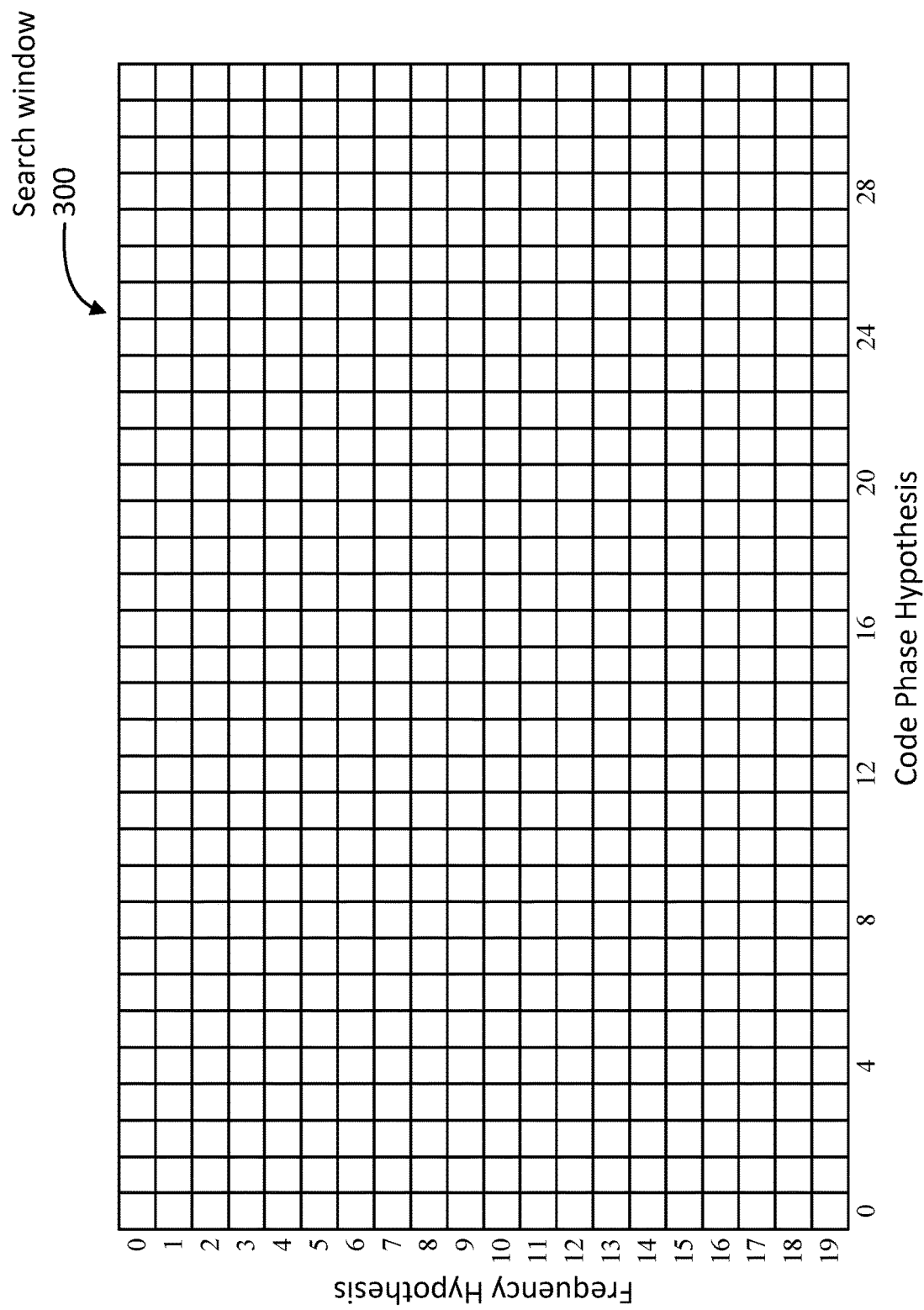
FIG. 3 illustrates a grid-based search window, according to an embodiment.

FIG. 3 shows an example of a grid-based search window 300 extending across twenty hypotheses in the frequency dimension and 32 code phase hypotheses or bins in the code phase dimension. Again, selection of the particular location and/or spacing of the hypotheses of each dimension of the search window 300 may be guided by information obtained externally (also referred to herein as "injected" location) and/or from one or more previous searches. For example, it may be known or estimated that a desired signal lies within a certain number of chips from a given code phase, and/or that the signal may be found within a certain bandwidth around a given frequency, such that the code phase search window may be defined accordingly. In a case where searches are to be conducted for more than one code, associated search windows need not have the same dimensions.

A search may be conducted (for example, according to a search window of D frequency hypotheses by C code hypotheses) to obtain a grid of D×C energy results, each result corresponding to one of the D frequency hypotheses and one of the C code hypotheses. The set of energy results that correspond to the code phase hypotheses for a particular frequency hypothesis may be referred to herein as a "Doppler bin."

Figure 4:
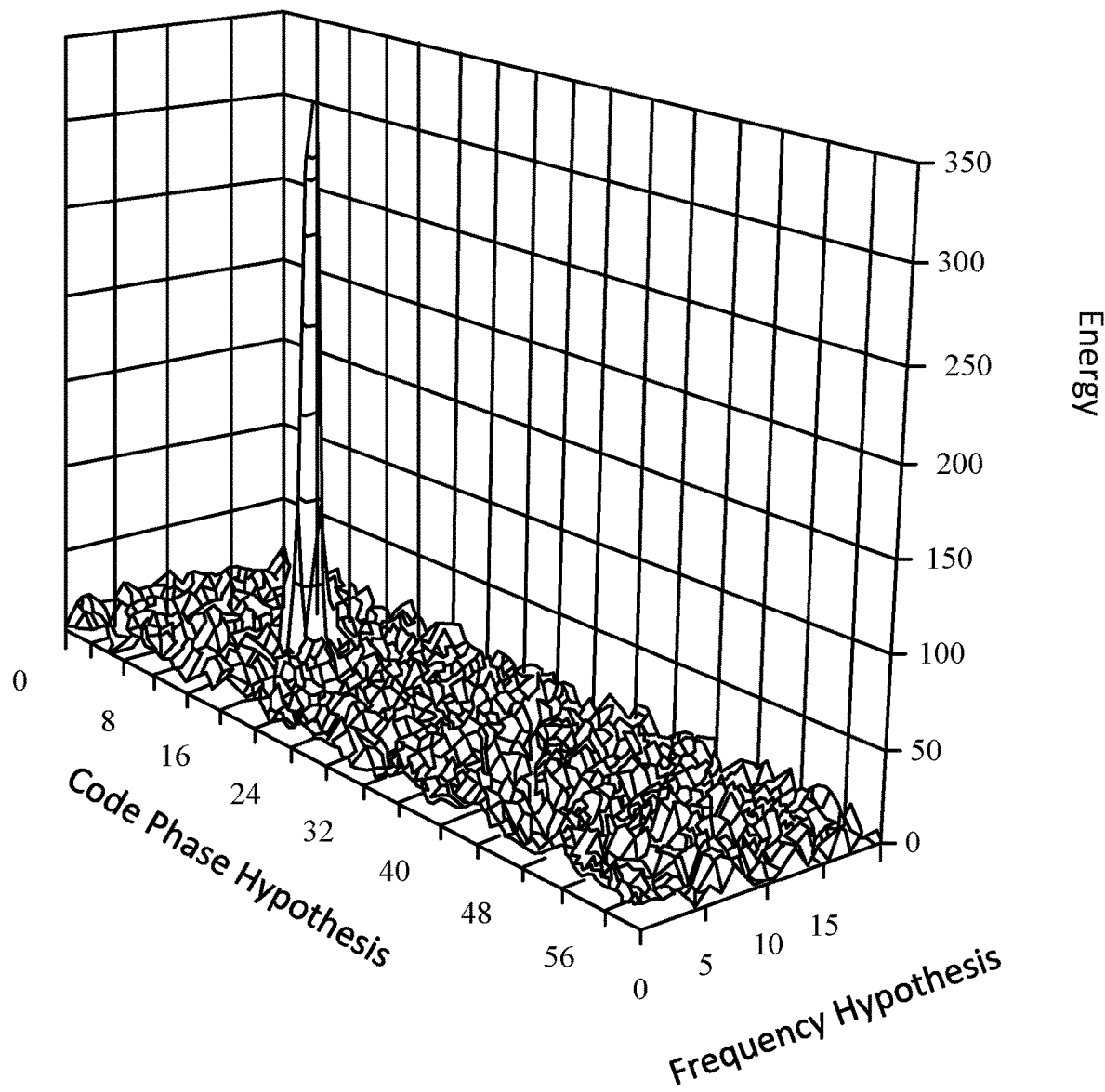
FIGS. 4 and 5 are example energy profiles used in a grid-based acquisition and tracking technique, according to an embodiment.

FIG. 4 shows an example of a peak within an energy profile or grid of twenty Doppler bins, each bin having 64 code phase hypotheses. In this example, adjacent code phase hypotheses are ½-chip apart, such that the grid extends across 32 chips in code space. An energy peak in this figure indicates a presence of the selected SV signal at code phase hypothesis 16 in Doppler bin 10. A receiver (or a searcher within such a device) may produce energy grids for several different corresponding SVs from the same portion of a received signal, with the grids possibly having different dimensions.

Figure 5:
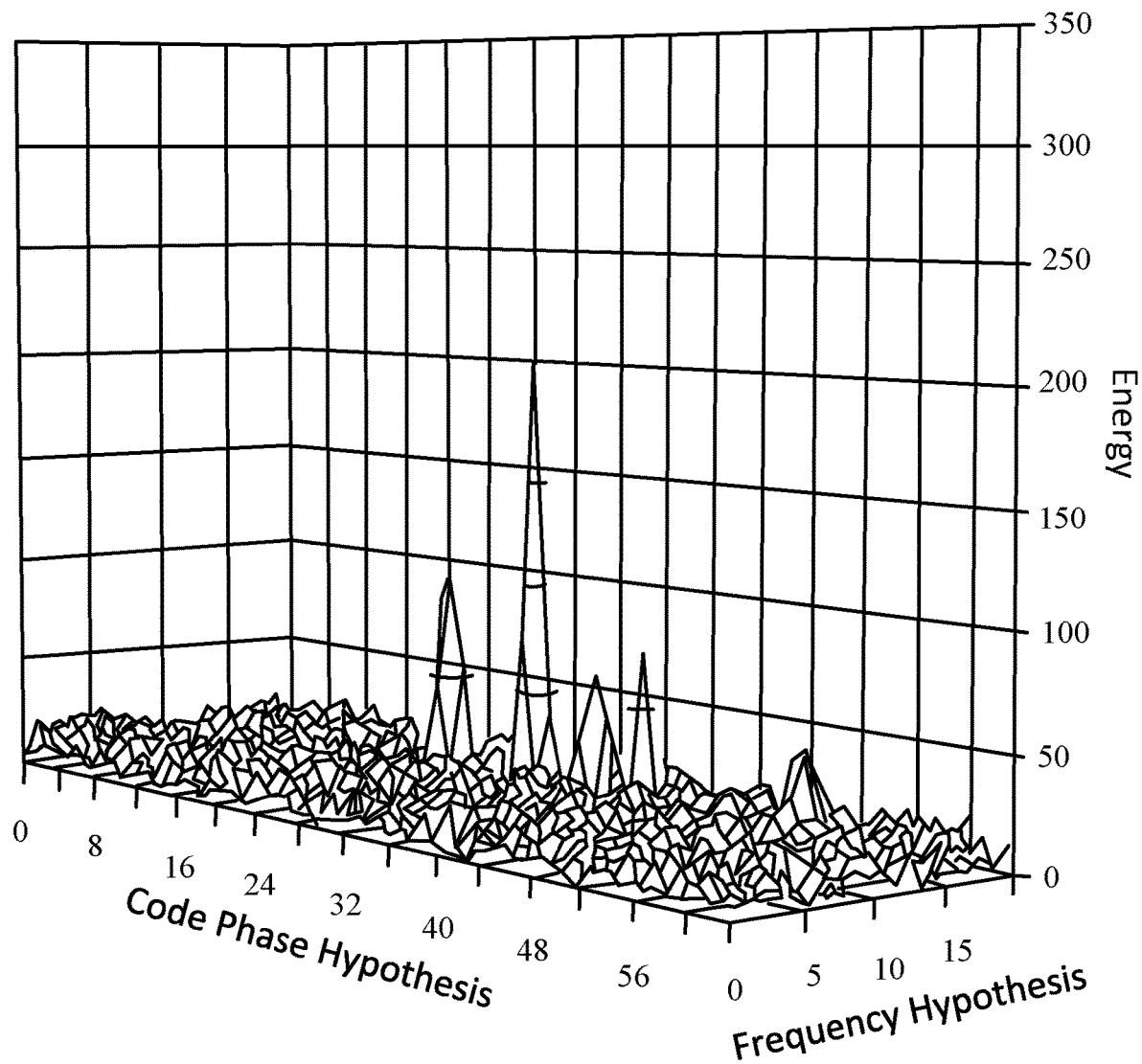

A received signal may include versions of the same transmitted signal that propagate over different paths to arrive at the receiver at different times. Correlation of such a received signal with the corresponding reference code may result in several peaks at different grid points, each peak due to a different instance (also called a multipath) of the transmitted signal. These multipath peaks may fall within the same Doppler bin. In addition to multipath, spoofing may produce one or more additional peaks. An example of an energy profile having multiple peaks is illustrated in FIG. 5.

As described above, in GPS system, each satellite continuously broadcasts GPS information using Coarse/Acquisition (C/A) code (e.g., repeat every 1 ms) in L1 band (e.g., at 1575.42 MHz) and encrypted precision (P/Y) code in L2 band (e.g., at 1227.60 MHz) with an about 50 bps data rate. The P(Y) code is encrypted and is used exclusively by authorized U.S. military receivers. The C/A code is not encrypted for general civilian access. In addition, signals transmitted by GNSS SVs generally have very low signal strength (e.g., less than about −120 dBm) by the time they arrive at a GNSS receiver. As a result, radio interference can overpower weak GNSS signals, causing satellite signal loss and potentially loss of positioning. Therefore, civilian GPS may be very vulnerable to spoofing attacks. Malicious actors may take advantages of this vulnerability and may send incorrect information in a competing signal (referred to as a spoofing signal). As noted, this may cause an additional energy peak in a Doppler bin that a GNSS receiver may then use to determine navigational data or time data that is different than what would otherwise be determined based on true GNSS signals. This can cause vehicles that rely on GNSS navigation signals to stray off course, or in extreme cases, GNSS spoofing systems can take control of a navigation system and reroute a vehicle to an unintended location. Thus, spoofing signals can cause accidents or other mischief.

A spoofing signal may have a corresponding purported source, for example, by having a format similar or identical to a format of signals sent by the purported source. For example, a spoofing signal may include the same PRN code associated with the purported satellite. However, the spoofing signal may have some modified parameters, such as time and/or date information, identification, encoded ephemeris or other encoded information that would lead the mobile device to calculate the wrong location or fail to calculate a location. For example, spoofing signals may simulate signals of a particular GNSS constellation at a particular frequency band such as GPS signals at L1 band or may comprise simulated signals corresponding to multiple GNSS constellations and/or of multiple frequency bands. The more complex the spoofing scenario becomes, the more technically difficult the scenario may be to create/emulate and the more expensive the spoofing scenario becomes to deploy. Spoofing signals may be GNSS-based (e.g., from an SV) or may be terrestrial-based (e.g., from fake base stations and/or access points).

GPS spoofing attacks may include two steps. In the first (takeover) step, a spoofer may lure the victim GPS receiver to migrate from a legitimate signal to a spoofing signal. In some cases, a spoofer may transmit faked GPS signals at a high power level, causing the victim to lose track of the satellites and lock on to the stronger spoofing signals. In some cases, a spoofer may transmit signals that are synchronized with the authenticate GPS signals and then gradually overpower the authenticate GPS signals to cause the migration. In the later cases, the spoofing signals may not generate abnormal jumps in the received signal strength, frequency, or time, but the spoofer may need to use specialized hardware to track and synchronize with the original signals in real time at the victim's location. In the second step, the spoofer may manipulate the GPS receiver by either shifting the signals' arrival time or modifying the navigation messages.

A GNSS receiver may be most vulnerable to spoofing signals during the time-frequency search for GNSS signal acquisition. Spoofing signals may be emulated, typically in a coordinated manner, and broadcast at a high signal level, such that the emulated signals and associated offsets and other characteristics may cause a receiver to calculate a false location or series of false locations. The spoofing signals can be coordinated by managing the frequency offset of each of the satellites to be consistent with a fake location or series of fake locations.

The goal of a spoofing system is to appear as consistent as possible with the real GNSS signals but to impart a doppler frequency offset and/or a timing delay offset consistent with a different location rather than the actual location of the GNSS receiver. For a spoofing signal to be reasonably convincing, the time information in the spoofing signal may need to be reasonably consistent with current satellite time for each constellation emulated. For example, the spoofing system may include a GNSS receiver to obtain current GNSS time and visible satellites. The messaging in the spoofing signal may need to be reasonably consistent with that from the actual satellites. The spoofing signals may need to include Doppler offsets that are consistent with a single but different location. The spoofing system may need to be in proximity to the GNSS receiver such that the signal strength of the spoofing signal can be significantly greater than the actual GNSS signals (e.g., ambient outdoors GNSS signal level).

Because the detection and ranging of the GNSS signal are done in the baseband through correlation, altering the frequency offset to be consistent with a different location across all visible satellites may be enough to alter the location calculated by the GNSS receiver. In one example, the spoofing system may receive existing GNSS signals, alter the frequency of each satellite signal to be consistent with a Doppler offset for a spoofed location, and rebroadcast the altered signal at a stronger signal strength, based upon the known satellite location (via the downloaded or demodulated assistance data), speed, and heading of each satellites, and the spoofed location. In some embodiments, encoded time of day may also be altered, which may not be needed for relatively short distances.

Figure 6:
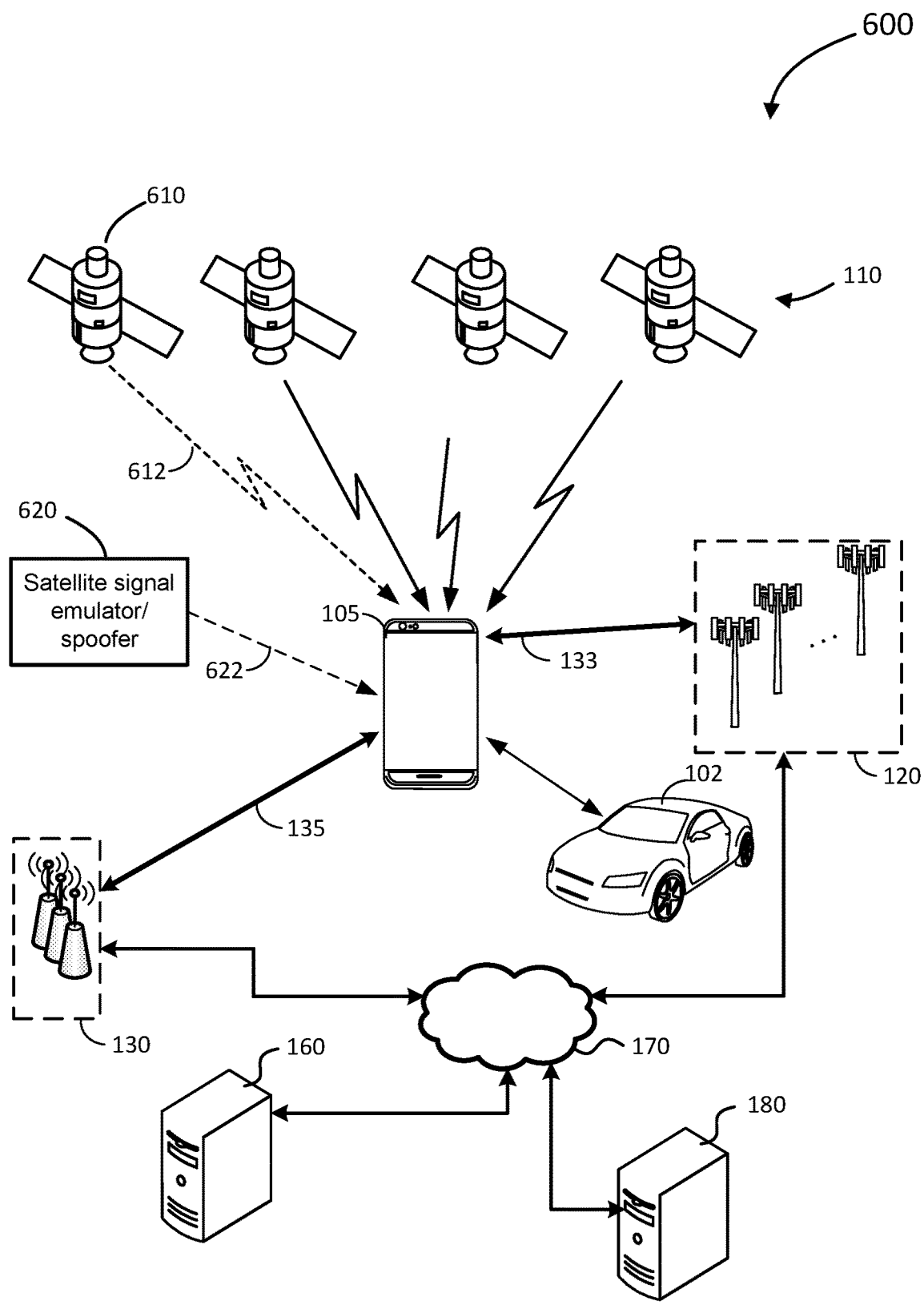
FIG. 6 is a diagram illustrating examples of anomalous GNSS signals in an example of a positioning system.

FIG. 6 illustrates examples of anomalous GNSS signals in an example of a positioning system 600. Positioning system 600 may be similar to positioning system 100 and may include, for example, vehicle 102, UE 105, satellites 110, base stations 120, APs 130, location server 160, network 170, and external client 180. Positioning system 600 may also include an SV 610 and a satellite signal emulator 620 that may transmit anomalous GNSS signals. For example, SV 610 may send an anomalous GNSS signal 612 to UE 105. Anomalous GNSS signal 612 has a carrier frequency, where the carrier frequency may be a frequency used by UEs to determine location using GNSS signals, such as an L1 frequency (1575.42 MHz) of a GPS system. Anomalous GNSS signal 612 may be anomalous in one or more ways. For example, anomalous GNSS signal 612 may be a spoofing signal, being produced with a format associated with SV 610 but being inaccurate, such as having incorrect timing, which may lead to an inaccurate determination of the range from UE 105 to SV 610. As another example, anomalous GNSS signal 612 may be a spoofed signal, having a format associated with another SV, such as another SV of the same constellation that contains SV 610 or another SV of a different constellation. In this case, a pseudorange determined for anomalous GNSS signal 612 may correspond to the range from UE 105 to SV 610 but UE 105 may use this range as a range from UE 105 to the expected location (e.g., as indicated by ephemeris data) of another SV. In either of these scenarios, inaccurate information in a signal of a format of SV 610 or a signal simulating a format of another SV may be received by UE 105, and UE 105 may calculate an incorrect location for UE 105, if UE 105 does not recognize anomalous GNSS signal 612 as being anomalous and thus would not take appropriate actions, such as not using anomalous GNSS signal 612 and/or a pseudorange determined from anomalous GNSS signal 612 to determine the location of UE 105.

In another example, UE 105 may receive anomalous GNSS signals 622 from a satellite signal emulator 620 (e.g., a spoofer). Satellite signal emulator 620 may be a GNSS signal simulator configured to produce and send signals that mimic GNSS signals. Anomalous GNSS signals 622 may thus emulate signals from (e.g., have formats (e.g., pseudo-random codes) corresponding to) SVs such as satellites 110. Anomalous GNSS signals 622 may have much higher power (and corresponding Doppler bin peaks) than non-anomalous GNSS signals from satellites 110 when received by UE 105, which may cause UE 105 to acquire and track anomalous GNSS signals 622 instead of the non-anomalous GNSS signals actually sent by satellites 110 as described above.

Figure 7:
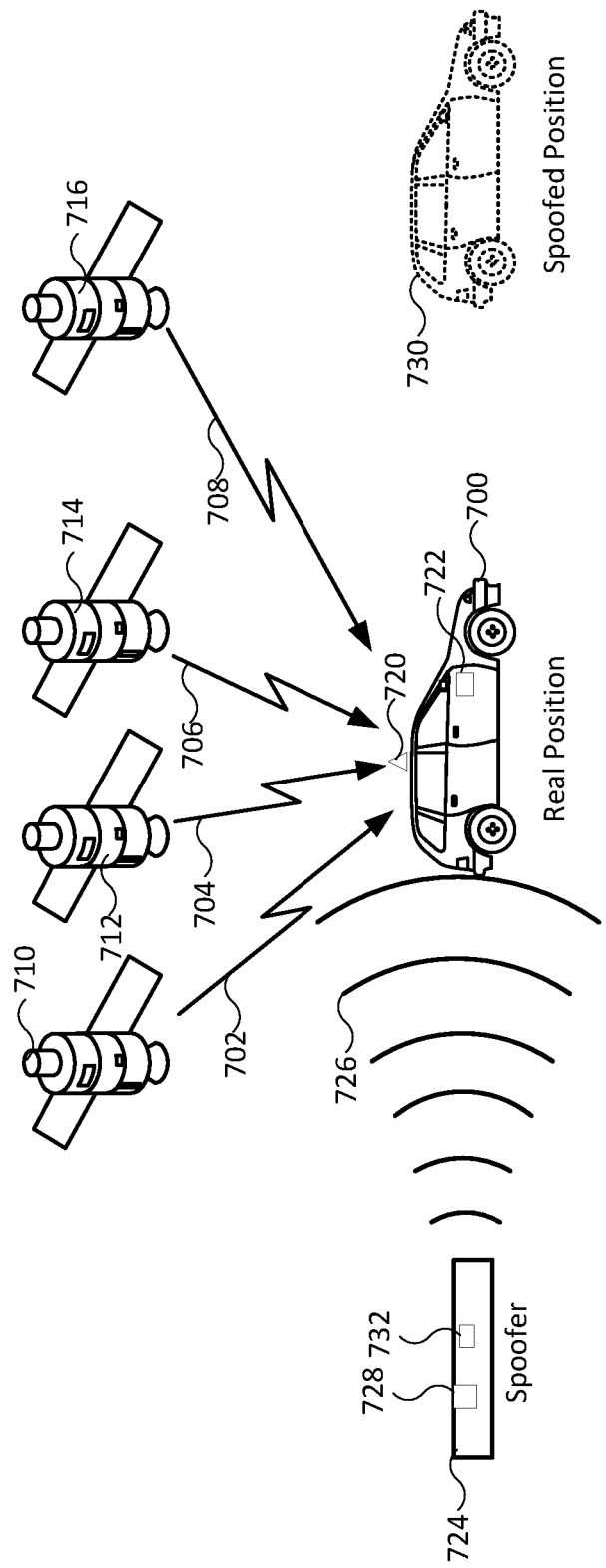
FIG. 7 is a diagram illustrating an example of spoofing by a spoofer.

FIG. 7 illustrates an example of how spoofing by a spoofer 724 may impact the estimated position of a vehicle that uses GNS-based positioning. Spoofer 724, which may be mobile or stationary, may be an example of satellite signal emulator 620. Spoofer 724 may include an antenna 728 and a transmitter 732. Spoofer 724 can generate a spoofing signal 726 that is received by a vehicle antenna 720. Spoofing signal 726 can be a composite signal which contains a plurality of false GNSS satellite signals. Spoofing signal 726 can be generated so as to mimic real GNSS satellite signals.

In some embodiments, spoofer 724 may be located at a fixed geographic location. In some embodiments, spoofer 724 may be mobile (e.g., attached to a vehicle, drone, or vessel). For example, the spoofer 724 could be up in a tower or other broadcast point or it could be in a car or other mobile vehicle that is following a target (e.g., vehicle 700). Instances in which a mobile spoofer 724 provides a spoofing signal that varies from the actual GNSS signal by only a little bit may be much harder to detect, and in such instances, according to some embodiments, a positioning engine of a GNSS receiver at a mobile device may rely more heavily on non-GNSS data sources for positioning. For example, a Bluetooth transceiver located at an ATM may be used to verify that the mobile device is near the ATM by verifying the GNSS location matches up with a location near the ATM via a secure (handshake, public private key exchange, etc.) close-range signal (e.g., where range may be determined using round-trip time (RTT) or signal strength ranging techniques) from the ATM.

Spoofer 724 can be designed to create false GNSS satellite signals in several ways. In some embodiments, spoofer 724 may create spoofing signal 726 by simulating real GNSS satellite signals programmed with the desired false satellite data. For example, spoofer 724 may capture real GNSS signals 702, 704, 706, and 708 at antenna 728, and then modify and rebroadcast these signals with transmitter 732. Spoofer 724 may create spoofing signal 726 by re-broadcasting live GNSS signals that include false GNSS data (e.g., for a first location) meant to be accepted by a GNSS receiver (e.g., at a second location) as real GNSS signals. Spoofer 724 may simulate stationary or moving locations as well. For example, a spoofer 724 may simulate locations that form in a circle around a geographic area.

Spoofing signal 726 can be a composite of a plurality of GNSS signals 702, 704, 706, and 708, as received by antenna 720. When GNSS signals 702, 704, 706, and 708 are rebroadcast from the spoofer transmitter, they become false GNSS satellite signals because they contain data as received by spoofer antenna 728 at a different location from the real position, resulting in a spoofed position 730. Spoofing signal 726 can contain any number of false GNSS satellite signals.

The power level of spoofing signal 726 can be set such that, when spoofing signal 726 is received by antenna 720, spoofing signal 726 overpowers real GNSS signals 702, 704, 706, and 708. Consequently, receiver 722 may use spoofing signal 726 to compute a GNSS location based on false GNSS satellite signal. Specifically, receiver 722 may measure the GNSS satellite signal phase (code phase and/or carrier phase) values of spoofing signal 726, use the code phase and/or the carrier phase values to compute GNSS location coordinates for a location different from the true location, and report that the vehicle is at a different location instead of its true location. This may be the intent of spoofer 724—to make receiver 722 believe and report that vehicle 700 is at a false location (e.g., spoofed position 730) that is different from the real position. Spoofing of a navigational system can also be performed to make a navigational device provide false timing data.

To address spoofing attacks, systems and methods according to this disclosure can, using various techniques, detect potential GNSS spoofing and reduce or minimize the effects of the spoofing signals on the positioning and navigation of mobile devices. Techniques may be performed by software and/or hardware components of a UE (such as a mobile device or vehicle). This may include circuitry included in and/or software executed by a GNSS receiver and/or application processor.

In some embodiments, spoofing signals may be detected by a GNSS receiver based on the signal strength. As described above, at a GNSS receiver, spoofing signals generated by a spoofer (e.g., satellite signal emulator 620 or spoofer 724) generally have signal strength greater than the signal strength of real GNSS signals transmitted by GNSS SVs, in order to lure the GNSS receiver to lock onto the stronger spoofing signals. Thus, a sudden increase in signal strength or a signal strength that is higher than a threshold value would indicate that the detected signal may be a spoofing signal. The threshold may be, for example, a typical GNSS signal strength in open sky condition or another signal environment. When the signal strength is consistently above the threshold, the signal may be a spoofing signal. In some embodiments, the threshold may be determined through crowdsourcing. In some embodiments, the Programmable Gain Amplifier (PGA) of the GNSS receiver may be monitored, and a PGA output reaching the positive or negative rail may indicate a strong spoofing signal is present. In some embodiments, an increase in signal (or carrier) to noise ratio may indicate that the received signal is a potential spoofing signal. In some embodiments, an increase in the noise floor may also indicate that the received signal is a potential spoofing signal.

In some embodiments, a GNSS receiver may detect spoofing signals by detecting the time discontinuities at the GNSS receiver. The time discontinuities may occur when the spoofing device is not synchronized with the GNSS time or when there is a significant delay in the spoofing signals sent out by a spoofer. As described above, a spoofer may need time to acquire real GNSS signals and generate the spoofing signals, and thus there may be a noticeable delay in generating the spoofing signals at the spoofing device. Thus, as the spoofing signals are acquired and used to determine location and time by a GNSS receiver that has been synchronized with GNSS time (e.g., in a hot mode), the GNSS receiver may detect a time change that may be approximately equal to the time delay associated with the processing time at the spoofing device.

In some embodiments, a GNSS receiver may detect spoofing signals by detecting a sudden change in the signal frequency of a GNSS signal at the GNSS receiver, in particular, when all signals are impacted coherently to indicate a new location. In some embodiments, Doppler shifts and/or phase delays of received GNSS signals may be compared to determine whether a signal with a higher strength may be anomalous (with signals outside the expected time windows and/or Doppler windows being identified as anomalous). Additionally or alternatively, a coarse location of a mobile device (e.g., determined based on Wide Area Network (WAN) and/or WLAN signals or other sensor data as described above) may be used to determine expected Doppler shift and phase shift, and an GNSS signal that is significantly different from the expected Doppler shift and/or phase shift may be identified as potentially being a spoofing signal.

In some embodiments, a GNSS receiver may detect spoofing signals by detecting a sudden change in the calculated location. As described above, a GNSS receiver may be in a tracking mode, where the determined GNSS pseudoranges may be fed into a Kalman filter or another location propagation filter. The location propagation filter may determine a propagated location, while the GNSS receiver may also predict a location based on pseudoranges determined using GNSS signals. If the difference between the propagated location and the predicted location is greater than a threshold value, a position jump may occur when the GNSS pseudoranges are used. Thus, the system may have locked onto spoofing signals instead of real GNSS signals. In some embodiments, as described above, other sensors, such as motion sensors, ultrasonic sensors, radar sensors, LIDAR sensors, wheel sensors, and the like, may be used to predict a location of a vehicle, as in positioning using dead reckoning techniques (e.g., pedestrian dead reckoning or automotive dead reckoning), and then the predicted location may be compared with the predicted location using GNSS pseudoranges. If the difference is greater than a threshold value, the GNSS signals used to determine the pseudoranges may be spoofing signals. In some embodiments, the location predicted based on GNSS signals may be compared with a location determined based on, for example, Wi-Fi and/or WAN-based trilateration and/or dead reckoning. If the difference is greater than a threshold value, the GNSS signals used to determine the pseudoranges may be spoofing signals. In some embodiments, if the location (and/or the history of the location) predicted based on GNSS signals does not match certain features (e.g., a straight street rather than a circle indicated by the GNSS signals) on a map or the surrounding environment (e.g., on land rather than on water, as determined using a camera), the GNSS signals may include spoofed signals. For example, if the GNSS receiver is on a street but the GNSS signals indicate that the GNSS receiver is in a different environment (e.g., in a boat), the GNSS signals may include spoofing signals.

In some embodiments, a disagreement (e.g., a difference in pseudorange and/or a resulting location estimate for a GNSS receiver beyond a threshold distance) between GNSS signals received from different constellations or different bands may indicate that some of the signals may be spoofing signals. If the signals disagree consistently by more than a threshold amount, such as an amount that cannot be explained by GNSS scatter, some of the signals may be spoofing signals. The threshold amount may be a fixed threshold or may be determined by measuring the GNSS scatter across the received signals.

As described above, GNSS signals may be received by a GNSS receiver from a satellite through multipath propagation. Thus, the GNSS receiver may find multiple peaks during the GNSS signal acquisition. The multipath propagation may result in the determined location being off a few hundred of meters, but generally may not result in a calculated location that is more than a few hundred meters away from the true location, such as in another city or another country. In addition, the multiple peaks caused by the multipath propagation may not be consistent over times and/or locations. Therefore, the multiple peaks caused by the multipath propagation may be differentiated from the multiple peaks caused by the spoofing signals. In some embodiments, the GNSS receiver may track two or more sets of self-consistent GNSS signals by solving the location (e.g., x, y, and z coordinates) and the coarse and fine time of the mobile device, using the least square fit technique and each respective set of self-consistent GNSS signals. If the locations determined using the two or more sets of self-consistent GNSS signals disagree in a consistent manner, at least one set of the GNSS signals may be spoofing signals. In one example, measurements of a first set of GNSS signals may yield one location, and measurements of signals from a second set of GNSS signals, albeit with stronger receive power, may coalesce around a different location that may be far off from the first location, then the second set of GNSS signals may be identified as potential spoofing signals. In such a scenario, there may be two clusters of locations, one close to a location based on historical data and/or other input data, and another one clustered around an emulated location that may not be the actual location. In some embodiments, the two or more sets of GNSS signals may be tracked in parallel. In some other embodiments, the GNSS signals may be saved to memory, and may be processed or re-processed to track the two or more sets of GNSS signals individually.

In some embodiments, the GNSS receiver may, based on the knowledge of the surrounding environment, identify spoofing signals if the received signals are not consistent with the surrounding environment. For example, if the GNSS receiver is in a noisy environment or an environment that should have multipath signals, but the received signals are unusually clean or have very low multipath peaks and/or are consistent, the received signals may include spoofing signals.

In some embodiments, a signal identified as potential spoofing signal may be re-checked to determine whether the signal is indeed a spoofing signal. For example, one or more techniques used to identify potential spoofing signals as described above may be repeated at different time or used in combination to determine and/or cross-check whether the signal is a spoofing signal.

In some embodiments, the mobile device (e.g., a vehicle or a mobile device) may detect potential spoofing signals using any methods or any combinations of methods described above, and may mitigate the effect of the potential spoofing signal(s) by, for example, ignoring the identified spoofing signal(s) in favor of non-spoofed and/or more reliable data sources. The mobile device may las also flag the spoofing signal(s) to other devices, such as via a location server or base station-based alert, or by marking signal sources in assistance data as unreliable.

In some embodiments, a group of strong signals, particularly if the strong signals are from the same GNSS constellation and the same band, may be used to determine a location, which may then be validated against terrestrial location signals, location propagation filter (e.g., Kalman filter) output, and/or recently stored location (e.g., less than an hour ago). If there is significant inconsistency, weaker GNSS signals stored in memory may be utilized to determine the location, while the stronger signals may be ignored. Additionally or alternatively, a secondary GNSS signal search may be performed to identify secondary or lower-strength correlation peaks to calculate a true location. For example, additional correlation peaks, including those further away from strong detected correlation peaks, may be reported to and utilized by the location engine, particularly if the weaker peaks are in agreement with predicted or known location approximations. In some embodiments, search windows may be set based on weaker GNSS signal sources, historic data, terrestrial signal sources, and/or time information, such that anomalous signal sources may be excluded from the search windows.

In one example, after a spoofing signal is detected, the GNSS receiver associated with a mobile device may ignore all GNSS signals and rely on other sources of location information, such as Wi-Fi and WAN signals, other sensor inputs, dead reckoning outputs, and the like. For example, if the mobile device includes a mobile phone, Wi-Fi-based, WAN-based, or hybrid trilateration or transceiver ID-based positioning techniques may be used to determine, possibly in conjunction with dead reckoning and sensor results, the actual location of the mobile phone. If the mobile device includes a vehicle, positioning based on outputs of other sensors (e.g., camera, LIDAR, IMU, etc.), map matching, or other positioning techniques may be used to determine the actual location of the vehicle.

In some embodiments, since the real GNSS signals are still present even though the GNSS receiver may have acquired the spoofing signals due to the higher signal strength of the spoofing signals, a GNSS receiver that is in tracking mode may narrow, tighten, or just maintain the current search window for each satellite to exclude stronger spoofing signals. In some embodiments, based on the output from a location propagation filter (e.g., Kalman filter using non-GNSS sources or historical propagated locations) and the satellite assistance data, a GNSS receiver may predict the correct search windows, if the GNSS receiver is not in the tracking mode yet.

FIG. 8 illustrates an example of grid-based tracking GNSS signals (or, more accurately, energy peaks corresponding to GNSS signals) using a propagated search window according to certain embodiments. As described above, to acquire a GNSS signal, the GNSS receiver may vary the carrier frequency and the code phase offset to search for a correlation peak between the GNSS signal from a satellite and received by the GNSS receiver and a locally generated PRN signal. The search may be performed within a search window in a grid 800 (similar to grids shown in FIGS. 2B-5) where the GNSS receiver may vary the carrier frequency and the code phase offset based on the corresponding carrier frequency hypothesis and code phase hypothesis associated with each grid point in the search window.

In the example shown in FIG. 8, a previous search may acquire a GNSS signal 810 with an associated code phase (or code phase offset) and a corresponding frequency (due to Doppler shift). Based on, for example, the code phase and the frequency of the previously acquired GNSS signal 810, information such as the location and/or speed of the satellite and the location and/or speed of the mobile device, and/or the previous search window and/or time and/or the satellite ephemeris information, a search window 805 may be determined. Search window 805 can be a narrow or tight window because the distance and relative speed between the mobile device and the satellite would not change suddenly and thus the code phase offset and the Doppler shift of the new GNSS signal 812 would not change drastically either. On the other hand, in order to cause the GNSS receiver to determine a location that is very different from the real location, a spoofing signal may have a very different code phase offset and/or frequency shift as shown by spoofing signal 820, 822, or 824, which may be outside of search window 805 and thus may not be acquired or locked on by the GNSS receiver. As a result, the spoofing signals may not have a significant impact on the positioning. The search windows for the next GNSS signal acquisitions may be similarly determined to acquire real GNSS signals 814, 816, and the like, in the subsequent sampling periods (e.g., every millisecond or every second). That said, at cold start when a wider window may be used, the search may still pick up the spoofed signal (or for any other reason that a broader window is used, such as when a GNSS receiver loses a lock on a signal), at which point traditional algorithms using the strongest peak would be hijacked by the spoofed signal.

It can be noted that, according to some embodiments, a GNSS signal (e.g., GNSS signal 810) may occasionally jump out of search window 805 (e.g., for a relatively small number of sampling periods) in a multipath environment due to signal bounce. However, in such embodiments, there may be a second, larger window (not shown) containing the search window 805 representing limits for such multipath jumps. The size of this larger window may be based on the largest possible multipath expected in an typical dense urban environment (resulting in position error of up to a city block or a few hundred meters of error, for example). In such multipath environments, the GNSS signal may sporadically revert back into the window when/if there is a direct line of sight. Further, each satellite may have different multipath since they are all sending signals from different areas of the sky and have different velocity vectors (which can affect frequency/Doppler differently). It can be further noted that the search window may be static or it may be enlarged for high multipath environments so as to not lose tracking on satellite signals in high multipath environments.

In some embodiments, as described above, two or more search/track windows, such as search windows 805 and 830, may be used to track two or more sets of signals, such as real GNSS signal 812 and a spoofing signal 822. In some embodiments, the spoofing signal (e.g., the stronger signal and/or the signal that has a large jump from the previous signal) may be subtracted from the digital signal data in baseband to enhance reception of the real GNSS signals. For example, the GNSS signals may first be saved to memory. After the spoofing signals are identified, the spoofing signals may be subtracted from the saved GNSS signals. In some embodiments, an active pole may be inserted with the frequency and code phase offset of the spoofed signal to attempt to remove the spoofed component.

In some embodiments, a broader search window may be used, where the GNSS receiver may not discard the weaker correlation peaks, but may instead identify clusters of peaks consistent with the current location predicted based on other sources and ignore stronger peaks that do not agree with location continuity predictions (because the mobile device would not jump suddenly to a location far away) and/or peaks that do not agree with other sources. This technique may be used at all time for spoofing mitigation or may only be used when a potential spoofing signal is detected using techniques described above.

As described above, spoofing signals may also be generated by a satellite launched by a hostile party, where the spoofing signals may cause jamming in the GNSS bands or may include spurious GNSS signals. Depending on the signal energy utilized, techniques described above and, in some embodiments, longer integration periods, active isolation and cancellation of spurious signals in baseband, and/or active window management (e.g., based on the different Doppler profiles of the satellites that are not co-located), may be used to mitigate the impact of the spoofing signal on the positioning. In some embodiments, by profiling the Doppler shifts against orbits, the origins of the spoofing signals, such as the satellite that generates the spoofing signals and the constellation of the satellite, may also be determined.

In some embodiments, information regarding the spoofing signals, such as the zones within which the spoofing signals are detected, features of a mobile spoofer (e.g., license plate or digital identification or other identifying features of a vehicle that transmits the spoofing signals), and the like, may be crowdsourced from individual GNSS receivers or mobile devices. For example, the information may be sent to other GNSS receivers or a location server that may collate the received information to generate certain assistance data that includes information such as the spoofing zones. The location server may then broadcast the assistance data to the GNSS receivers.

Figure 9A:
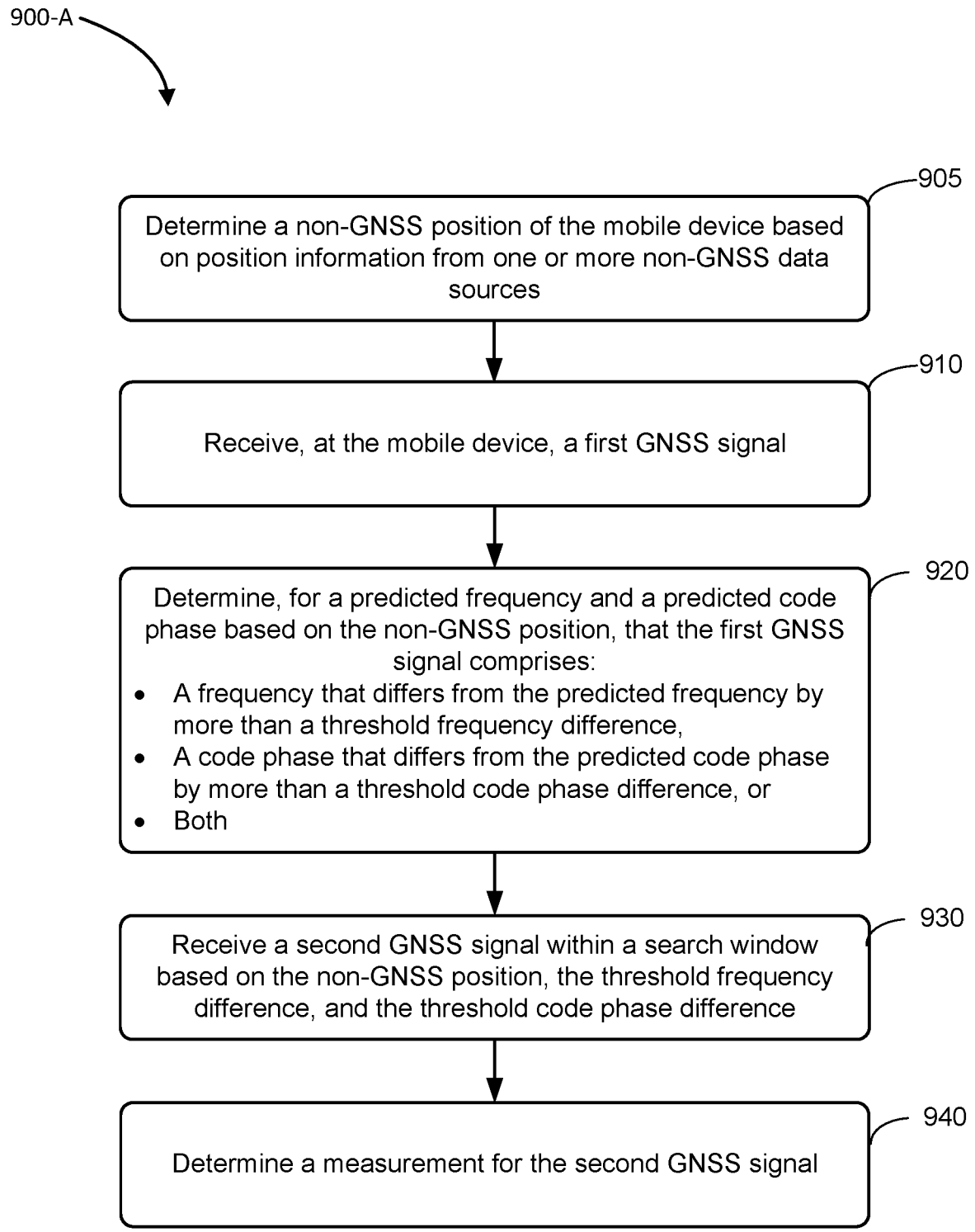
FIGS. 9A-9B are flow diagrams illustrating examples methods of determining a location of a mobile device in the presence of spoofing signals according to certain embodiments.
Figure 11:
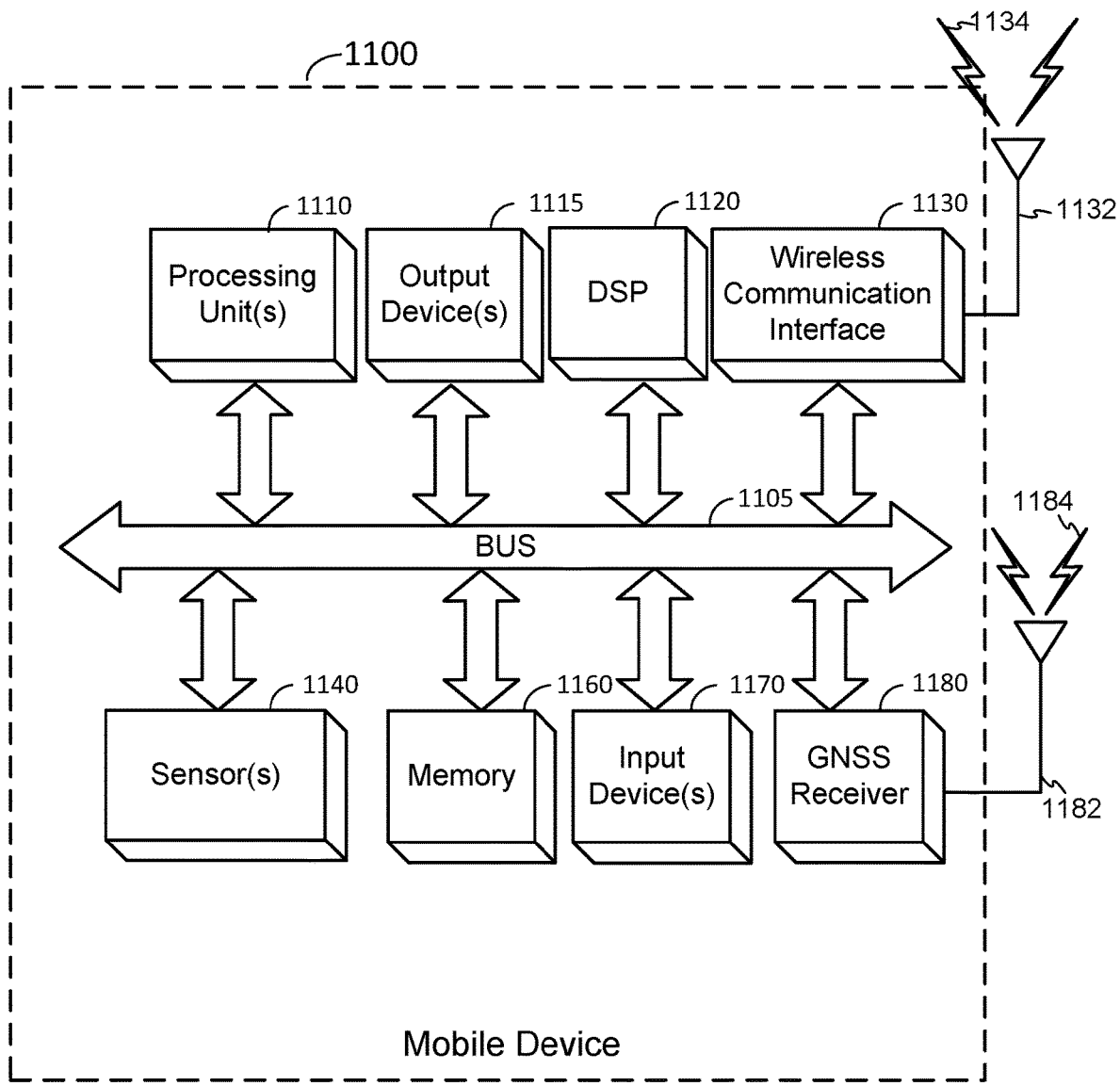
FIGS. 11 and 12 are block diagrams of example mobile devices according to certain embodiments.
Figure 12:
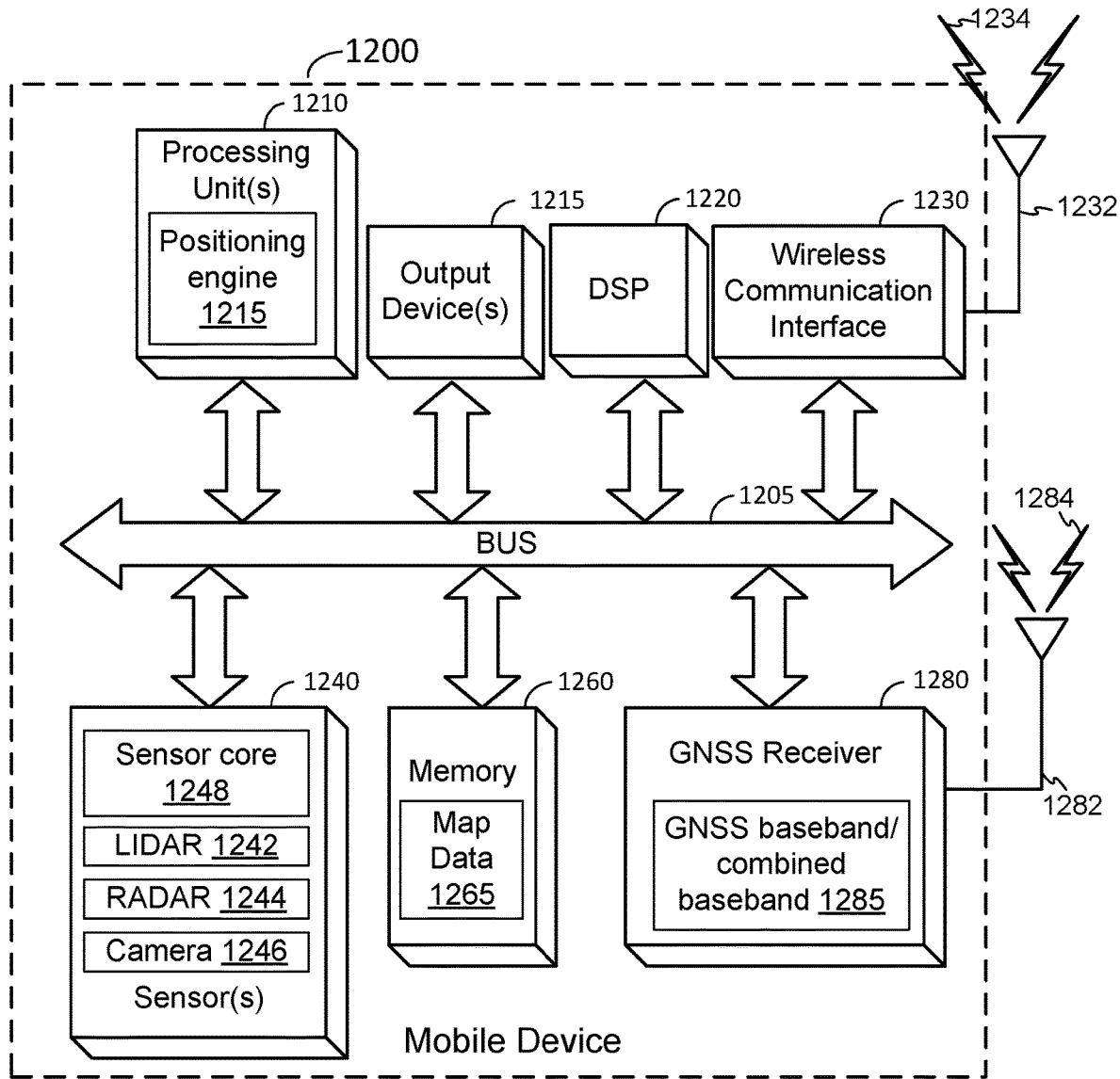

FIG. 9A is a flow diagram illustrating an example of a method 900-A of determining a correct location of a mobile device in the presence of GNSS spoofing, according to certain embodiments. The mobile device may include, for example, a mobile phone, vehicle, and/or other type of UE or electronic device. It is noted that the operations illustrated in FIG. 9A and described herein provide particular positioning techniques to detect and mitigate the impact of spoofing signals on the positioning. Other sequences of operations can also be performed according to alternative embodiments. For example, alternative embodiments may perform the operation in a different order. Moreover, the individual operations illustrated in FIG. 9A can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives. In various embodiments, the means for performing the functionality illustrated in method 900-A may include, for example, a GNSS receiver and/or a processing unit of a mobile device, which may include hardware and/or software components for performing the described functionality. For example, means for performing the operations in method 900-A may include various components of a mobile device, such as a wireless communication interface 1130, wireless communication antenna(s) 1132, a bus 1105, a digital signal processor (DSP) 1120, processing unit(s) 1110, memory 1160, GNSS receiver 1180, and/or other components of a mobile device 1100, as illustrated in FIG. 11 below; and/or a wireless communication interface 1230, wireless communication antenna(s) 1232, a bus 1205, a digital signal processor (DSP) 1220, processing unit(s) 1210, memory 1260, GNSS receiver 1280, and/or other components of a mobile device 1200, as illustrated in FIG. 12 below.

The functionality at block 905 comprises determining a non-GNSS position of the mobile device based on position information from one or more non-GNSS data sources. Here, the position information from the one or more non-GNSS data sources may comprise any of a variety of information from data sources (other than current GNSS information) indicative of the location of the mobile device. This position information, therefore, may include multilateration of the mobile device based at least in part on signals from terrestrial transceivers (e.g., RAT-based positioning, WLAN-based positioning, etc.), WAN cell sector center, access point (AP) location (e.g., location based on a nearest AP), map data, sensor data, or dead reckoning positioning information, or a combination thereof. The sensor data, too, may vary, depending on the sensors available to the mobile device. Sensor data can include, for example, data from a motion sensor, a magnetometer, a wheel sensor, a camera, a radar, a LIDAR, or a sonar sensor, or combination thereof.

It can be noted that while the non-GNSS position may not be based on current GNSS signals, it may be based, at least in part, on previous GNSS information. The non-GNSS position may, for example, be provided by a positioning engine (e.g., a Kalman filter), which may use information from a variety of data sources including the previously-mentioned terrestrial transceivers, sensors, etc., as well as historical location/previous position fixes that may have used GNSS information (e.g., prior GNSS location information).

As described in more detail below (e.g., with respect to FIG. 12), a non-GNSS position of the mobile device may be determined and/or obtained by an application processor (e.g., using a positioning engine), in view of data from one or more location data sources. The application processor may then provide the location to a GNSS receiver and/or provide data enabling the GNSS receiver to define a search window in view of the non-GNSS position. In such embodiments, the method 900-A may further comprise receiving the non-GNSS position at a GNSS receiver of the mobile device from an application processor of the mobile device.

At block 910, the functionality comprises receiving, at the mobile device, a first a GNSS signal. This may comprise, for example, acquiring the first GNSS signal from a cold start receiver. From a cold start, a GNSS receiver may search a very large search space. For example, the search window could encompass as much as an entire country or more, or as little as a maximum antenna range on a terrestrial transceiver. However, with the position information, this search base may be narrowed somewhat. For example, if the mobile device has access to a recent prior position or an infrastructure based (e.g., RAT-based or WLAN-based) position, the search space may be narrowed around the current location and, if available, the current time. (However, it may be assumed that the search window is wide enough and/or the spoofed GNSS signal is close enough in frequency and phase offset such that the spoofed GNSS signal is captured by the current search window parameters.) Furthermore, according to some embodiments, a GNSS receiver may save processing power by searching for a single satellite, then later determining where other satellites our using ephemeris and time.

At block 920, the functionality comprises determining, for a predicted frequency and a predicted code phase based on the non-GNSS position, that the first GNSS signal comprises a frequency that differs from the predicted frequency by more than a threshold frequency difference, a code phase that differs from the predicted code phase by more than a threshold code phase difference, or both. As noted herein, an approximate location of a satellite relative to the mobile device can be determined from approximate position of the mobile device (e.g., the non-GNSS position of the mobile device), time and/or time uncertainty, and/or ephemeris data for the satellite. In some embodiments, ephemeris information can be used to detect spoofing. Ephemeris information may include long term ephemeris, regular ephemeris sent from a location server, and/or demodulated ephemeris for each satellite, and may be used to determine an approximate location of a given satellite, at a particular time. Using this information, a GNSS receiver can determine the predicted frequency and code phase for a GNSS signal from the satellite. Using a confidence and/or accuracy of the non-GNSS position, historical information, and/or other relevant data, the mobile device can determine thresholds for the frequency difference and phase difference within which the GNSS signal from the satellite is to be expected.

At block 930, the frequency comprises receiving a second GNSS signal within a search window based on the non-GNSS position, the threshold frequency difference, and the threshold code phase difference. Here, the frequency window can be centered, for example, on the non-GNSS position, and sized in accordance with the threshold frequency difference and threshold code phase difference. Specifically, according to some embodiments, the search window may be selected such that the first GNSS is outside the search window. Moreover, the search window may be implemented using one or more tracking loops (e.g., implementing loop-based acquisition/tracking). Additionally or alternatively, the search window may be a part of a two-dimensional tracking grid including different combinations of code phase offsets and signal frequencies (e.g., grid-based acquisition/tracking). Traditional loop-based and grid-based acquisition/tracking often acquires and tracks the strongest signal (which oftentimes may be a spoofing signal). And thus, establishing a search window in the manner provided at block 930 may enable a GNSS receiver to acquire and track a legitimate GNSS signal (within an expected or predicted search space) in the presence of a stronger-powered spoofing signal.

At block 940, the method 900-A comprises determining a measurement for the second GNSS signal. This measurement may comprise, for example, a pseudorange or a pseudorange and carrier phase. According to some embodiments, if the measurement of the second GNSS signal results in an estimated position (e.g., estimated by a positioning engine) that agrees with the non-GNSS position within a threshold amount, then the second GNSS signal may be determined to be a legitimate GNSS signal, and the first GNSS signal may be determined to be a spoofing signal. (It can be noted that, to determine an estimated position, multiple satellites (e.g., three or more) may be used to determine the estimated position. And thus, the second GNSS signal may be one of many used to determine the estimated position of the mobile device.) Thus, some embodiments of the method 900-A may further comprise determining an updated position of the mobile device based on the measurement (e.g., pseudorange) for the second GNSS signal and/or determining the first GNSS signal to be a spoofing signal. As noted elsewhere herein, determining whether a pseudorange results in an estimated position that "agrees" with the non-GNSS position may involve determining a least squared fit or other location calculation, where the fit/error term can be analyzed (e.g., against a threshold value) when the location is determined using the first GNSS signal for a plurality of satellites.

According to some embodiments, the method 900-A may further comprise subtracting the spoofing signal from a plurality of received signals to receive the second GNSS signal. According to some embodiments, the first GNSS signal is received by the mobile device via a first frequency or GNSS constellation and the second GNSS signal is received by the mobile device via a second frequency or GNSS constellation. Additionally or alternatively, determining the first GNSS signal to be a spoofing signal may be based, at least in part, upon determining that the first signal is from a first constellation and is inconsistent with a location of the mobile device determined using a second constellation Determining the first GNSS signal to be the spoofing signal may be performed in any of a variety of ways, depending on desired functionality. For example, according to some embodiments, determining the first GNSS signal to be a spoofing signal may be based, at least in part, on the spoofing signal having a signal strength greater than a threshold value. This threshold value may be determined, according to some embodiments, based on a GNSS signal strength level in open sky condition.

According to some embodiments, determining the first GNSS signal to be a spoofing signal may comprise determining a position fix of the mobile device based on received signals comprising the first GNSS signal, and identifying, based on determining that the position fix is inconsistent with the non-GNSS position, the received signals as including the spoofing signal. Additionally or alternatively, determining the first GNSS signal to be a spoofing signal may comprise acquiring the first GNSS signal and identifying the first GNSS signal as the spoofing signal based on determining that one or more locations determined from a pseudorange of the first GNSS is inconsistent with map data. Here, as noted in further detail below, this inconsistency may comprise the mobile device being in a location that, in view of map data, is impossible or unlikely.

According to some embodiments, determining the first GNSS signal to be a spoofing signal may comprise determining that a difference between a signal frequency of the first GNSS signal and a signal frequency of a previously captured GNSS signal is greater than a threshold value. That is, the first GNSS signal frequency may be inconsistent with historical data regarding frequency for a corresponding GNSS signal.

According to some embodiments, determining the first GNSS signal to be a spoofing signal may comprise acquiring two sets of self-consistent signals, wherein one set of the self-consistent signals comprises the first GNSS signal. In such embodiments, determining a respective position fix of the mobile device may be based on the set of self-consistent signals that does not comprise the first GNSS signal. Such embodiments may further comprise identifying, based on a difference between the two respective position fixes, the one set of the self-consistent signals comprising the first GNSS signal as including the spoofing signal. If two sets of self-consistent signals are detected, the set closest to the non-GNSS position may be determined to be a legitimate GNSS signal, and the other set may be determined to be a spoofing signal. Here, self-consistent signals suggest a reasonably small error estimate out of the least squared fit. If there is a tight fit/small error among the set of self-consistent signals that do not agree with the non-GNSS position, it may be indicative of spoofing (e.g., rather than multipath). Multipath, which would affect different satellites (e.g., of the same or distant constellation) differently, would likely result in a large error.

According to some embodiments, determining the first GNSS signal to be a spoofing signal comprises acquiring the first GNSS signal, and identifying the first GNSS signal as the spoofing signal based on (i) determining a change of a code phase of the first GNSS signal beyond a threshold change in code phase, (ii) determining a change of a frequency of the first GNSS signal beyond a threshold change in frequency, (iii) or both. As previously noted, these changes may occur between sampling periods. Exceptions for multi-path may be provided where (as previously indicated) a larger search window can be used to account for jumps in frequency and/or code phase based on multipath.

According to some embodiments detecting the spoofing signal may comprise acquiring the first GNSS signal and identifying the first GNSS signal as the spoofing signal based on determining rate-of-change of the first GNSS signal's code phase, frequency, or both being different than a previously-determined or predicted rate-of-change beyond a threshold value. For example, if spoofed, the determined location of the mobile device may change more than what has been observed (historical data) or what is expected (e.g., based on motive movement). For example, vehicles rarely move faster than 100 mph on the highway and perhaps 30-50 mph in the city. Pedestrians typically do not move more than 10 mph. and thus, types of movement (driving, walking, etc.) if known by the mobile device, can be used to determine a maximum threshold on code phase change and frequency change. A type of movement may be determined by an application processor based on, for example, sensor input and/or other data.

Figure 9B:
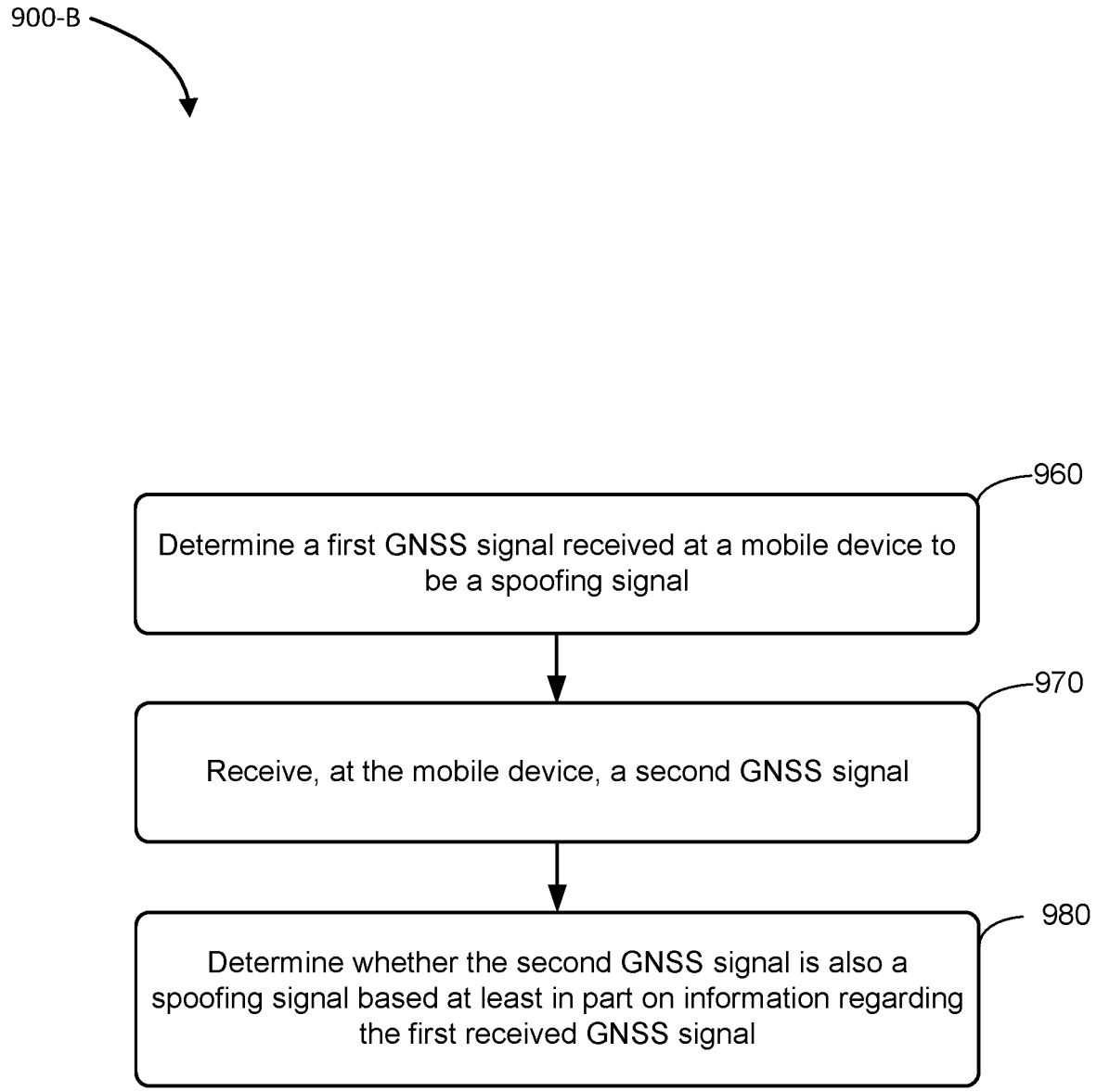

FIG. 9B is a method 900-B illustrating an example embodiment of using information regarding a spoofing signal to process and/or categorize GNSS signals. Again, the operations illustrated in FIG. 9B and described herein provide particular techniques for detecting and mitigating the impact of spoofing signals on the positioning of a mobile device. Some or all of the functionality illustrated in the blocks of FIG. 9B may be performed in conjunction with some or all of the functionality illustrated in the blocks of FIG. 9A. Other sequences of operations can also be performed according to alternative embodiments. For example, alternative embodiments may perform the operation in a different order. Moreover, the individual operations illustrated in FIG. 9B can include multiple sub-operations that can be performed in various sequences as appropriate for the individual operation. Furthermore, some operations can be added or removed depending on the particular applications. In some implementations, two or more operations may be performed in parallel. One of ordinary skill in the art would recognize many variations, modifications, and alternatives. In various embodiments, the means for performing the functionality illustrated in flow diagram 900-B may include, for example, a GNSS receiver and/or a processing unit of a mobile device, which may include hardware and/or software components for performing the described functionality. For example, means for performing the operations in flow diagram 900 may include various components of a mobile device, such as a wireless communication interface 1130, wireless communication antenna(s) 1132, a bus 1105, a digital signal processor (DSP) 1120, processing unit(s) 1110, memory 1160, GNSS receiver 1180, and/or other components of a mobile device 1100, as illustrated in FIG. 11 below; and/or a wireless communication interface 1230, wireless communication antenna(s) 1232, a bus 1205, a digital signal processor (DSP) 1220, processing unit(s) 1210, memory 1260, GNSS receiver 1280, and/or other components of a mobile device 1200, as illustrated in FIG. 12 below.

At block 960, the functionality comprises determining a first GNSS signal received at the mobile device to be a spoofing signal. The determination of that the first GNSS signal is a spoofing signal may be made using any of the techniques described herein (e.g., comparison of a frequency and/or code phase with predicted frequency and/or code phase based on a non-GNSS location, exceeding a signal strength threshold, inconsistency with map data, etc.).

At block 970, the functionality comprises receiving, at the mobile device, a second GNSS signal. The second GNSS signal may be in the same or a different constellation as the first GNSS signal, may be received within a search window established by the mobile device (e.g., using the techniques described herein), or the like.

At block 980, the functionality comprises determining whether the second GNSS signal is also a spoofing signal based at least in part on information regarding the first received GNSS signal. Here, the mobile device can leverage information regarding the first GNSS signal in any of a variety of ways. For example, the mobile device can reduce the size of the search window based on characteristics (frequency and/or code phase offset) of the first GNSS signal. As noted elsewhere herein, spoofing signals may be tracked (e.g., using a grid-based or loop-based tracking approach, wherein a search window is centered on the spoofing signal), and ongoing knowledge about tracked spoofing signals may be further leveraged for any newly-detected GNSS signal. Code windows, for example, may be predicted by a tracked spoofing signal to enable the detection of similarly-spoofed signals. For example, time, frequency offset, and code phase offset derived from a spoofing signal for one satellite can be used, along with ephemeris, to determine a spoofing signal code phase offset and frequency offset for other satellite signals being spoofed within the same constellation. Additionally or alternatively, any newly-detected GNSS signal that falls within a window of a tracked spoofing signal could be identified as a spoofing signal and, if desired, also tracked. Any spoofing signal identified by the mobile device can be communicated to other mobile devices, servers, etc. to help identify and mitigate the effects of the spoofing.

Figure 10:
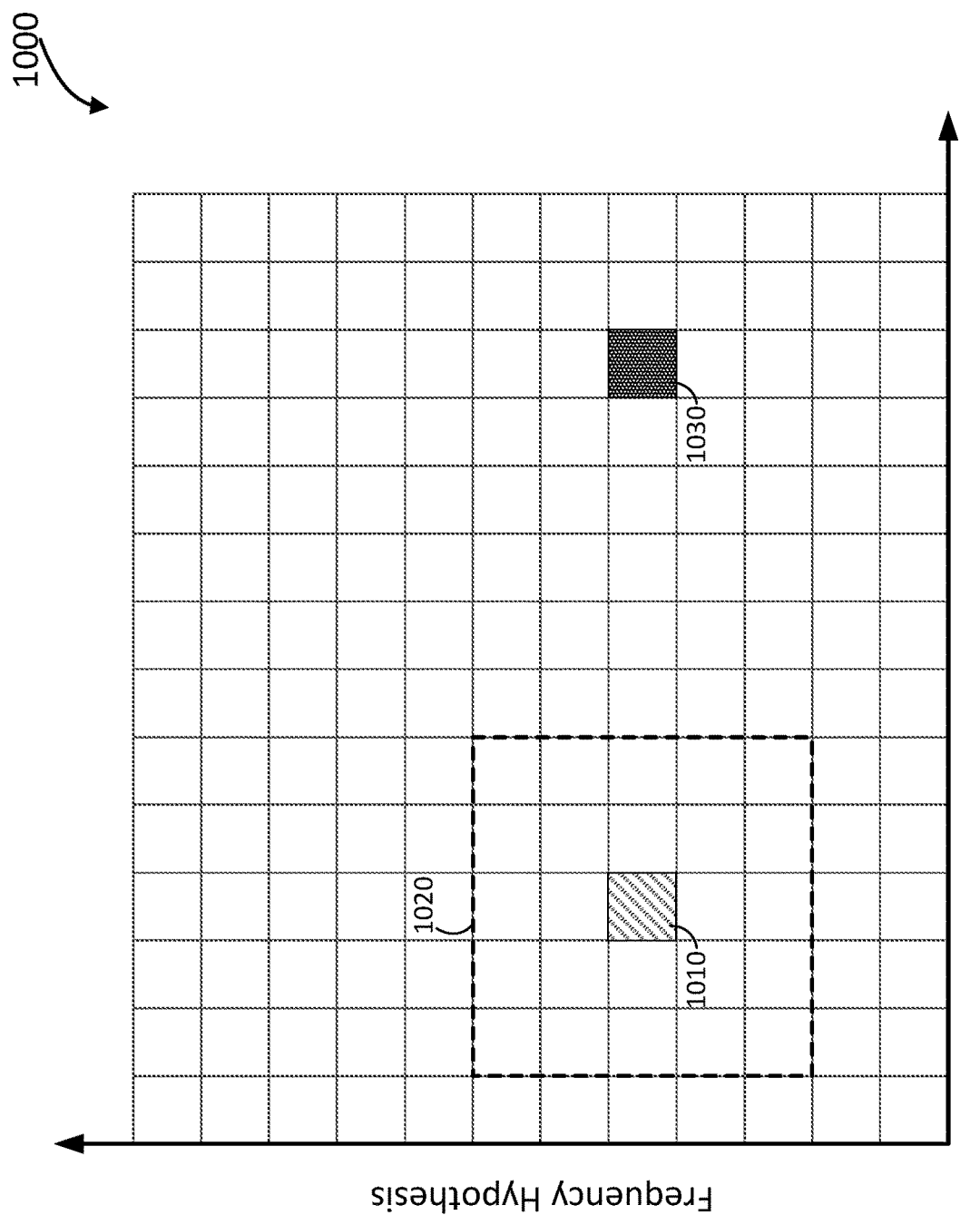
FIG. 10 is an illustration of a grid that shows a type of spoofing detection that may be conducted in a grid-based approach, according to an embodiment.

FIG. 10 is an illustration of a grid 1000 that shows how this type of spoofing detection may be conducted in a grid-based approach. This approach may vary, depending on whether the GNSS receiver has already acquired and is tracking a GNSS signal, or whether the GNSS receiver has not yet acquired a GNSS signal. The techniques for spoofing detection described with regard to FIG. 10 may reflect one or more of the techniques previously described with regard to FIG. 9.

If the GNSS receiver is already locked on to (e.g., tracking) GNSS signal 1010, the GNSS receiver will likely have valid time and ephemeris an may establish a window 1020 based the relative position of the satellite to the GNSS receiver (derived from time and ephemeris) within which the GNSS receiver tracks the GNSS signal 1010 (e.g., in the manner described above). The window 1020 may then be used as a threshold on how far the GNSS signal 1010 is allowed to "jump" to other grid points of the grid 1000 for successive measurements. The size of the window 1020 may be further based on expected variation in real signals based on multipath. In some embodiments, for example, the window 1020 may be sized such that a GNSS signal 1010 is not allowed to jump in frequency and/or code phase that would result in an estimated position of the GNSS receiver that changes 100$m$ or more. (Other embodiments may implement a larger or smaller window 1020, depending on requirements.) In this way, a spoofed signal 1030 (and some multipath signals with a very large error) can be ignored when not helpful to a navigation solution for the GNSS receiver. Other location constraints may also be used to inform the size and location of the window 1020. In the case of vehicles, for example, these location restraints may comprise lane or road boundaries; buildings, obstacles, or other objects where vehicles cannot be (or are very unlikely to be) located; etc. As another example, if the GNSS receiver loses track on a satellite, the search window for one or for a few satellites can be expanded. In such instances, the spoofing signal may be captured and techniques provided herein can be used for identifying an actual GNSS signal (e.g., based on non-GNSS position). In that case, the GNSS signal from the lost satellite may become visible again in search windows that are consistent with the signals from satellites with corresponding GNSS signals that are still tracked. (Separate search windows across all satellites could then be used to verify if there is a spoofing signal, if desired.)

According to some embodiments, historical tracking data may be used to identify patterns and ensure consistency of a tracked GNSS signal 1010. For example, the movement of a GNSS signal 1010 across a grid 1000 may be tracked over a time while the satellite is visible. In such embodiments, a GNSS receiver may apply a rate-of-change threshold such that the GNSS signal 1010, to be used for positioning/navigation, must not move further than is consistent with prior movement of the GNSS signal 1010 across the grid 1000. This rate of change may also be based on historical or real-time movement data of the GNSS receiver. According to some embodiments, different rate-of-change thresholds may be used for frequency and for code phase.

If a GNSS receiver has not yet acquired a GNSS signal 1010, some modifications to the previously described functionality may be made. If the GNSS receiver does not have valid time, it may be able to acquire reasonable time from a network (e.g., systems of a wide area network (WAN) that provide time or Internet time servers that provide time or other servers). Valid ephemeris may be used or acquired (e.g., demodulated or received from a network), and an approximate position can also be obtained as previously described (e.g., from a recent position estimate, from other positioning techniques, etc.), then the time, ephemeris, and approximate location can be used to predict a boundary for the window 1020 in which the GNSS signal 1010 is expected to be received. The size of the window 1020 can be based on uncertainty in the time and/or approximate location.

A spoofing signal 1030 located outside the established window 1020 may be relatively strong. However it can be ignored for purposes of position estimation in favor of weaker GNSS signal 1010 satellite signal that is within the predicted boundaries. As approximate location (using non-GNSS means) changes, the location of the window 1020 may correspondingly change, thereby maintaining an ongoing threshold that a GNSS receiver can use to identify a spoofing signal 1030. Further, once a GNSS signal 1010 is acquired within the window 1020, additional constraints may be used with regard to tracking acquired GNSS signals 1010, as previously described.

According to some embodiments, an energy threshold may be established and used additionally or alternatively, to detect a spoofing signal 1030. For example, a GNSS receiver may use a tracked GNSS signal 1010 and/or historical data from GNSS signals to determine expected energy levels and establish a maximum energy threshold. If the GNSS receiver receives a spoofed signal 1030 with an energy level that exceeds this threshold (even if the spoofed signal 1030 is within the window 1020), the GNSS receiver can disregard the spoofed signal 1030.

Embodiments are not limited to the grid-based acquisition or tracking approaches described in the embodiments above. Embodiments may, for example, utilize loop-based tracking (e.g., frequency and/or code loops) that often used by GNSS receivers. In fact, various types of GNSS receivers may implement various types of techniques for frequency and code tracking. Embodiments for determining the correct location of the GNSS receiver in the presence of GNSS spoofing provided herein can be implemented regardless of the type of tracking used (e.g., grid-based tracking, loop-based tracking, or otherwise). Referring again to FIG. 2A for example, the complex downconversion and digital baseband processing at block 216 may be used to implement frequency and/or code phase loops that enable loop-based acquisition/tracking (in addition or as an alternative to providing grid-based acquisition/tracking). In this example, the I and Q components provided as input to block 216 each may be provided to code and carrier loops, which may be tuned to respectively track acquired code and carrier signals. This tuning can be modified to provide a search window to provide reliable positioning of the mobile device in the presence of spoofing, similar to the grid-based approaches previously described.

For example, if a GNSS receiver has acquired a GNSS signal when a spoofing signal is encountered, the spoofing signal may cause a jump in code phase and/or frequency to account for the spoofed solution. Again, using valid time and ephemeris, a GNSS receiver may establish a search window that sets a threshold on the maximum frequency change and maximum code phase change allowable by the frequency and code tracking loops (e.g., these loops can be tuned as previously described to only accept changes in frequency and/or code phase below these maximums). Further, by integrating longer using a center frequency and code phase (as predicted using time and ephemeris), as propagated, for example, using a Kalman or other filter, the original GNSS signal can still be tracked. Again, embodiments can allow for real signal variation based on multipath and other signal anomalies when determining the threshold so that the signal variation would not cause a location to move more than a threshold amount. (This can be based on a threshold change in pseudorange, rather than actual location of the GNSS receiver.) Thus, signals causing such variations beyond the established threshold can be ignored.

As with previously-described embodiments, frequency and code phase changes may be tracked over time to establish rate-of-change thresholds. In other words, while the satellite of a tracked GNSS signal is within line of sight, a rate-of-change threshold for the frequency and/or code phase may be established such that a jump in the tracked GNSS signal, to be accepted, must not move the signal further in frequency and/or code phase than is consistent with prior movement.

If a GNSS receiver has not yet acquired a GNSS signal when the spoofing signal is encountered, time, ephemeris, and approximate location can be obtained in the manner previously described and used to set the size of the search window (e.g., predicting maximum and minimum frequency thresholds, as well as maximum and minimum code phase thresholds). The frequency and code phase loops can be tuned accordingly to implement this search window, thereby allowing the GNSS receiver to identify a true GNSS signals within the designated thresholds. Similar to moving the window 1020 grid-based approach based on changes in the approximate location of the GNSS receiver, embodiments using tracking loops can modify threshold boundaries for frequency and code phase loops as approximate location based on non-GNSS sources changes. Further, once a signal is acquired within the search window (established thresholds), the constraints mentioned above in regard to receivers that having already acquired GNSS signals may be used.

FIG. 11 illustrates an embodiment of a mobile device 1100, which can be utilized as described herein above (e.g., in association with FIGS. 1-11). For example, the mobile device 1100 may correspond with UE 105 of FIGS. 1 and 6, and/or can perform one or more of the functions of the methods shown in FIGS. 9A and 9B. It should be noted that FIG. 11 is meant only to provide a generalized illustration of various components, any or all of which may be utilized as appropriate. It can be noted that, in some instances, components illustrated by FIG. 11 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 11.

The mobile device 1100 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, application specific integrated circuits (ASICs), and/or the like), and/or other processing structures or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below). The mobile device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The mobile device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1100 to communicate with other devices as described in the embodiments above. The wireless communication interface 1130 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof.

Depending on desired functionality, the wireless communication interface 1130 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1100 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1100 can further include sensor(s) 1140. Sensors 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 1100 may also include a GNSS receiver 1180 capable of receiving and processing signals 1184 from one or more GNSS satellites (e.g., in the manner described herein) using an antenna 1182 (which could be the same as wireless communication antenna 1132). Positioning based on GNSS signal measurement can be utilized to complement and/or incorporate the techniques described herein. The GNSS receiver 1180 can extract a position of the mobile device 1100, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1110, DSP 1120, and/or a processing unit within the wireless communication interface 1130 (e.g., in a modem). Additional details regarding such embodiments are described hereafter with regard to FIG. 12. A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like.

The positioning engine may also be executed by one or more processing units, such as processing unit(s) 1110 or DSP 1120.

The mobile device 1100 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile device 1100 (and/or processing unit(s) 1110 or DSP 1120 within mobile device 1100). In an aspect, then such code and/or instructions can be used to configure and/or adapt a general-purpose computer (or other device) to perform one or more operations in accordance with the described methods.

As previously indicated, the previously embodiments (including the functionality described in relation to FIGS. 8-10 and the architecture in FIG. 11) may be implemented in whole or in part by a GNSS receiver 1180, which may include hardware and/or software components, separate from DSP 1120 and processing unit(s) 1110, enabling such functionality. That said, some embodiments may employ at least some functionality using processing unit(s) 1110 (e.g., application processor or other processing unit/hardware component external to a physical GNSS receiver 1180).

FIG. 12 is a block diagram that illustrates a mobile device 1200, according to an embodiment. The mobile device 1200 of FIG. 12 illustrates a variation to the mobile device 1100 of FIG. 11, in which various subcomponents are additionally shown, to help illustrate an embodiment in which a positioning engine 1215 may be executed by a processing unit 1210, such as an application processor, that may be separate from a physical GNSS receiver 1280.

Components illustrated in FIG. 12 with like components in FIG. 11 may provide the functionality previously described with respect to FIG. 11. In FIG. 12, however, a positioning engine 1215 executed by processing unit(s) 1210 may receive information from which to calculate the position of the mobile device 1200 from various subcomponents, such as a LIDAR 1242, radar 1244, and/or camera 1246 of the sensor(s) 1240. (This may comprise raw sensor data and/or sensor data that has undergone some preprocessing by sensor core 1248.) Additional data sources for the positioning engine 1215 comprise map data 1265 (which may be stored in memory 1260) and GNSS baseband/combined baseband 1285 (which may be a component of the GNSS receiver 1280).

The positioning engine 1215 may determine the position of the mobile device 1200 by using an EKF, WLS, a hatch filter, particle filter, or the like to determine a position solution by integrating data from one or more of the various location data sources (identified in the previous paragraph).

To determine a solution, the positioning engine 1250 may obtain input from the various data sources and de-weight outlier data. During GNSS acquisition, the processing unit(s) 1210 may send a request to the GNSS receiver for a location. The processing unit(s) 1210 may also provide information to the GNSS receiver 1280 by "injecting" an approximate location (seed location), ephemeris data (if available), and time if available. If the GNSS receiver 1280 locks onto a spoofing signal, the output of the GNSS receiver 1280 (e.g., pseudorange from the GNSS baseband/combined baseband 1285) may no longer agree with the other inputs to the positioning engine 1215, and the positioning engine 1215 may de-weight or potentially ignore the GNSS pseudorange outputs coming out of the GNSS receiver/baseband.

According to some embodiments, if a positioning engine 1215 detects a faulty input from the GNSS receiver 1280, the positioning engine 1215 may inject an approximate (seed) location based upon input from location other data sources, as well as time and valid ephemeris if needed, to reset the GNSS receiver 1280 to the correct time/code phase for each satellite. According to some embodiments, the positioning engine 1215 may further send an indication of potential spoofing and/or a maximum frequency and/or code phase threshold based on current location uncertainty to enable the GNSS receiver 1280 to operate in an anti-spoofing mode. In an anti-spoofing mode, the GNSS receiver 1280 may ignore a stronger signal in favor of a detected signal within the appropriate thresholds as described above. Similarly, according to some embodiments, the GNSS receiver 1280 can notify the positioning engine 1215 of a jump in frequency, code phase (e.g. using grid-based or tracking loop-based approaches) and request re-injection of correct parameters by the positioning engine 1215. Additionally or alternatively, the GNSS receiver 1280 may provide an indication to the positioning engine 1215 to de-weight or ignore GNSS signals until detected spoofing signals are no longer present, or to use the re-injection of parameters to verify and output of the GNSS receiver 1280, enabling the GNSS receiver 1280 to determine whether to track or ignore certain received GNSS signals.

According to some embodiments, multiple frequencies of GNSS signals transmitted by a satellite may be monitored to determine whether one frequency is being spoofed. In GPS, for example, a multi-band GNSS receiver may monitor at least two of L1, L2, and L5 bands. If only one band is spoofed, a positioning engine (e.g., executed by the GNSS receiver and/or and application processor) can prioritize pseudorange measurements determined from the GNSS signal that does not cause a frequency and/or phase jump greater than a threshold and/or results in a location solution that is consistent with historical location and speed of travel and heading. According to some embodiments, a GNSS signal having the most stable C/No (carrier-to-noise-density ratio) characteristics may be selected. The C/No difference between the various bands (L1, L2, and L5) should be stable and less antenna gains are very different on the antenna. This can be modeled, but assuming a common gain pattern or stable orientation of the antenna, the C/No difference should be stable. Further, a step change in intra-system signal bias or inter-signal system bias is indicative of a spoofer if temperatures stable and no other RF delays have been changed. With regard to the spoofed band, the GNSS receiver can wait for the spoofing to stop before using the corresponding GNSS signal again and/or combining it with the GNSS signal on the band that is being used (e.g., for increased accuracy). The GNSS signal from the non-spoofed band can be leveraged for signal acquisition when the GNSS receiver again determines to acquiring tracked GNSS signals from the (formerly) spoofed band again.

According to some embodiments, the use of multiple constellations can be leveraged in a manner similar to the use of multiple bands in the preceding paragraph. That is, for a GNSS receiver capable of receiving GNSS signals from multiple constellations, if GNSS signals from a first constellation is determined to be spoofed, the GNSS receiver may continue to use GNSS signals from a second constellation that is determined not to be spoofed (e.g., that are consistent with historical position/velocity/heading, consistent with other data, etc.). GNSS signals from the first constellation may be periodically checked to determine whether they are still being spoofed. GNSS signals from the second constellation can be used as a data source to verify whether spoofing is still taking place. Additionally or alternatively, spoofed GNSS signals from the first constellation can be tracked (e.g., in the manner described herein). If such spoofed signals undergo jumps in frequency and/or code phase (e.g., similar to jumps made when spoofing is initiated), it may be indicative of the signal no longer being spoofed. Thus, such jumps can trigger checks (e.g., against reliable location data sources) to determine whether signals may still be spoofed.

With regard to the above-described embodiments regarding monitoring multiple frequencies and/or multiple constellations, a weighted least squares solution may be computed (e.g., continuously) per constellation\frequency combination and compare the position, velocity, and time (PVT) to determine if any frequencies or constellations become inconsistent with other solutions. As an example using constellations, suppose GPS and GLO are spoofed consistent with each other, and GLO and BDS are authentic. If a GNSS-based inconsistency is detected on GPS or GLO only, it can be applied to the constellation and/or frequency it was discovered on, then spread to the consistent solution that is spoofed so they are all removed. According to some embodiments, an independent input can be used to identify a PVT that is spoofed and remove it. For example, a PVT that is spoofed can be identified based on a difference (beyond a threshold amount) from a positioning solution based on 5G, testing designated position (TDP), or WLAN, or micro-electromechanical system (MEMS).

Figure 13:
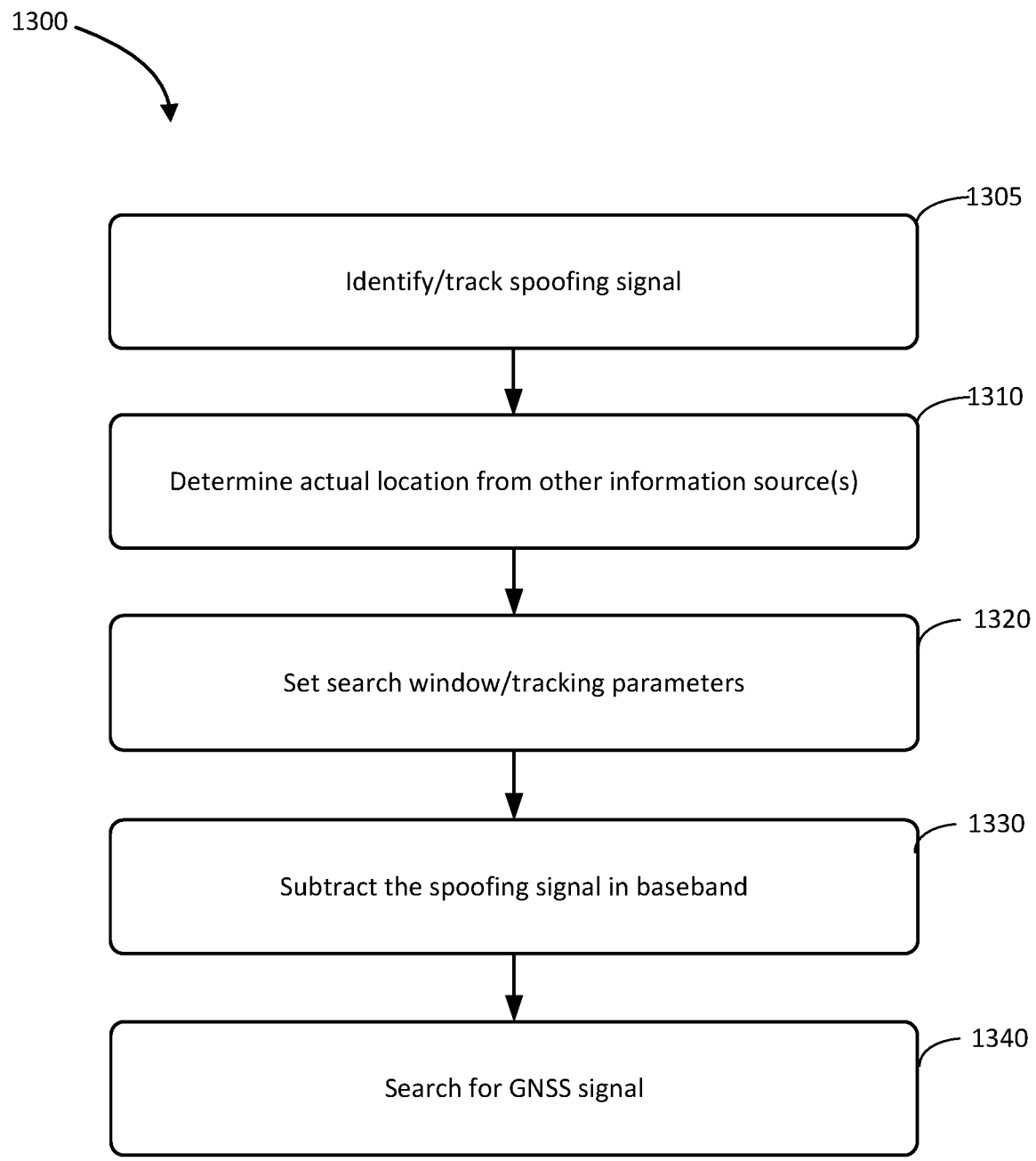
FIG. 13 is a flow diagram of an example method of how a spoofed signal may be subtracted from received signals, according to an embodiment.

Depending on available resources, some embodiments may track spoofed signals and subtract the spoofed signals to better acquire actual GNSS signals. FIG. 13 is a flow diagram of an example method 1300 of how this may be done. Means for performing the method 1300 may comprise hardware and/or software components of a GNSS receiver, for example. The specific implementation may vary, for example, depending on whether a tracking grid or tracking loops are used. Broadly put, if a spoofing signal is detected and a search window is established to detect a legitimate GNSS signal, then a pole may be created, for example, at the center of the spoofed signal frequency and code phase and all or part of the at spoofing signal can be removed so that the spoofing signal may be correlated out within the search window.

At block 1305, the method 1300 comprises identifying and tracking a spoofing signal. This can be done using any of the techniques described herein. For example, a spoofing signal may be detected comparing a corresponding pseudorange or position derived from the signal with data from other location data sources. The spoofing signal may then be tracked using, for example, tracking loops and/or a grid-based tracking solution.

At block 1310, the location of the GNSS receiver can be determined from one or more other location data sources. This can be determined using a positioning engine (e.g., Kalman filter), for example, using one or more location data sources, such as LIDAR, RADAR, camera, map data, sensors, and/or positioning solutions from other positioning systems, such as 5G/WAN, WLAN (e.g., Wi-Fi), etc.

At block 1320, the functionality comprises setting a search window (for grid-based tracking) and/or tracking parameters (for loop-based tracking) for the actual GNSS signal, based on the determined location at block 1310. As noted herein, the size of the search window and/or parameters for tracking loops can be set based on an accuracy and/or confidence level of the position determination. As described in other embodiments, the spoofing signal may be tracked separate from the acquisition and/or tracking of the actual GNSS signal. Moreover, using the techniques provided herein, the search window and/or tracking parameters for the actual GNSS signal may be set to exclude the spoofing signal. However, in cases where the spoofing signal still falls within the search window and/or tracking parameters for the actual GNSS signal, the spoofing signal can be subtracted, as further indicated in the method 1300.

At block 1330, the spoofing signal is subtracted in the baseband. This can be done, for example, at the GNSS receiver, having identified the spoofing signal. In so doing, the GNSS receiver can effectively "ignore" the spoofing signal and more easily identify the actual GNSS signal. (It can be noted, however, that some embodiments may not engage in true subtraction of the signal. In some embodiments, the signal is buffered and a pole can be used where the spoofing is to eliminate or reduce the spoofing signal in baseband is much as possible.) As such, at block 1340, the functionality comprises searching for the GNSS signal (after having subtracted the spoofing signal).

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of determining a mobile device location resistant to Global Navigation Satellite System (GNSS) spoofing, the method comprising: determining a non-GNSS position of the mobile device based on position information from one or more non-GNSS data sources; receiving, at the mobile device, a first GNSS signal; determining, for a predicted frequency and a predicted code phase based on the non-GNSS position, that the first GNSS signal comprises: a frequency that differs from the predicted frequency by more than a threshold frequency difference, a code phase that differs from the predicted code phase by more than a threshold code phase difference, or both; receiving a second GNSS signal within a search window based on the non-GNSS position, the threshold frequency difference, and the threshold code phase difference; and determining a measurement for the second GNSS signal.

Clause 2: The method of clause 1, wherein the position information from one or more non-GNSS data sources comprises: multi-lateration of the mobile device based at least in part on signals from terrestrial transceivers, Wide Area Network (WAN) cell sector center, Access Point (AP) location, map data, sensor data, or dead reckoning positioning information, or a combination thereof.

Clause 3: The method of clause 2, wherein the sensor data comprises data from: a motion sensor, a magnetometer, a wheel sensor, a camera, a radar, a LIDAR, or a sonar sensor, or combination thereof.

Clause 4: The method of any of clauses 1-3 further comprising, receiving the non-GNSS position at a GNSS receiver of the mobile device from an application processor of the mobile device.

Clause 5: The method of any of clauses 1-4, wherein the non-GNSS position is based on a previous position estimation for the mobile device.

Clause 6: The method of any of clauses 1-5 further comprising, selecting the search window such that the first GNSS signal is outside of the search window.

Clause 7: The method of any of clauses 1-6, wherein the search window is implemented using one or more tracking loops.

Clause 8: The method of any of clauses 1-6, wherein the search window is a part of a two-dimensional tracking grid including different combinations of code phase offsets and signal frequencies.

Clause 9: The method of any of clauses 1-8 further comprising, determining an updated position of the mobile device based on the measurement for the second GNSS signal.

Clause 10: The method of any of clauses 1-9 further comprising, determining the first GNSS signal to be a spoofing signal.

Clause 11: The method of clause 10, wherein determining the first GNSS signal to be a spoofing signal is based, at least in part, on the spoofing signal having a signal strength greater than a threshold value.

Clause 12: The method of clause 11, wherein the threshold value is determined based on a GNSS signal strength level in open sky condition.

Clause 13: The method of any of clauses 10-12, wherein further comprising subtracting the spoofing signal from a plurality of received signals to receive the second GNSS signal.

Clause 14: The method of clause 10, wherein determining the first GNSS signal to be a spoofing signal comprises: determining a position fix of the mobile device based on received signals comprising the first GNSS signal and additional GNSS signals from a plurality of GNSS satellites; and identifying, based on determining that the position fix is inconsistent with the non-GNSS position, the received signals as including the spoofing signal.

Clause 15: The method of clause 10, wherein determining the first GNSS signal to be a spoofing signal comprises: identifying the first GNSS signal as the spoofing signal based on determining that a location determined from a pseudorange of the first GNSS signal is inconsistent with map data.

Clause 16: The method of clause 10, wherein determining the first GNSS signal to be a spoofing signal comprises: determining that a difference between a signal frequency of the first GNSS signal and a signal frequency of a previously captured GNSS signal is greater than a threshold value.

Clause 17: The method of clause 10, wherein determining the first GNSS signal to be a spoofing signal comprises: obtaining two sets of self-consistent signals, wherein one set of the self-consistent signals comprises the first GNSS signal; determining a respective position fix of the mobile device based on each of the two sets of self-consistent signals; and identifying, based on a difference between the two respective position fixes, the one set of the self-consistent signals comprising the first GNSS signal as including the spoofing signal.

Clause 18: The method of clause 10, wherein determining the first GNSS signal to be a spoofing signal comprises: identifying the first GNSS signal as the spoofing signal based on: determining a change of a code phase of the first GNSS signal beyond a threshold change in code phase, determining a change of a frequency of the first GNSS signal beyond a threshold change in frequency, or both.

Clause 19: The method of clause 10, determining the first GNSS signal to be a spoofing signal comprises: acquiring the first GNSS signal; and identifying the first GNSS signal as the spoofing signal based on determining rate-of-change of a code phase, a frequency, or both, of the first GNSS signal being different than a previously-determined or predicted rate-of-change beyond a threshold value.

Clause 20: The method of any of clauses 1-19, wherein the first GNSS signal is received by the mobile device via a first frequency or GNSS constellation and the second GNSS signal is received by the mobile device via a second frequency or GNSS constellation.

Clause 21: The method of clause 10, wherein determining the first GNSS signal to be a spoofing signal is based, at least in part, upon determining that the first GNSS signal is from a first constellation and is inconsistent with a location of the mobile device determined using a second constellation.

Clause 22: A mobile device for determining a location resistant to Global Navigation Satellite System (GNSS) spoofing, the mobile device comprising: an antenna configured to receive GNSS signals; a memory; and one or more processing units communicatively coupled with the antenna and the memory, wherein the one or more processing units are configured to: determine a non-GNSS position of the mobile device based on position information from one or more non-GNSS data sources; receive, via the antenna, a first GNSS signal; determine, for a predicted frequency and a predicted code phase based on the non-GNSS position, that the first GNSS signal comprises: a frequency that differs from the predicted frequency by more than a threshold frequency difference, a code phase that differs from the predicted code phase by more than a threshold code phase difference, or both; receive, via the antenna, a second GNSS signal within a search window based on the non-GNSS position, the threshold frequency difference, and the threshold code phase difference; and determine a measurement for the second GNSS signal.

Clause 23: The mobile device of clause 22, wherein the position information from one or more non-GNSS data sources comprises: multi-lateration of the mobile device based at least in part on signals from terrestrial transceivers, Wide Area Network (WAN) cell sector center, Access Point (AP) location, map data, sensor data, or dead reckoning positioning information, or a combination thereof.

Clause 24: The mobile device of clause 23, wherein the sensor data comprises data from: a motion sensor, a magnetometer, a wheel sensor, a camera, a radar, a LIDAR, or a sonar sensor, or combination thereof.

Clause 25: The mobile device of any of clauses 22-24 wherein: the one or more processing units comprise an application processor and a processor within a GNSS receiver of the mobile device; and the processor within a GNSS receiver of the mobile device is configured to receive the non-GNSS position from the application processor.

Clause 26: The mobile device of any of clauses 22-25, wherein the application processor is configured to execute a positioning engine, and wherein the non-GNSS position is determined using the positioning engine.

Clause 27: The mobile device of any of clauses 22-26, wherein the one or more processing units are further configured to select the search window such that the first GNSS signal is outside of the search window.

Clause 28: The mobile device of any of clauses 22-27, wherein the search window is implemented using one or more tracking loops.

Clause 29: The mobile device of any of clauses 22-27, wherein the search window is a part of a two-dimensional tracking grid including different combinations of code phase offsets and signal frequencies.

Clause 30: The mobile device of any of clauses 22-29, wherein the one or more processing units are further configured to determine an updated position of the mobile device based on the measurement for the second GNSS signal.

Clause 31: The mobile device of any of clauses 22-30, wherein the one or more processing units are further configured to determine the first GNSS signal to be a spoofing signal.

Clause 32: The mobile device of clause 31, wherein the one or more processing units are configured determine the first GNSS signal to be a spoofing signal based, at least in part, on the spoofing signal having a signal strength greater than a threshold value.

Clause 33: The mobile device of clause 32, wherein the one or more processing units are further configured to subtract the spoofing signal from a plurality of received signals to receive the second GNSS signal.

Clause 34: The mobile device of clause 31, wherein the one or more processing units, when determining the first GNSS signal to be a spoofing signal, are configured to: determine a position fix of the mobile device based on received signals comprising the first GNSS signal and additional GNSS signals from a plurality of GNSS satellites; and identify, based on determining that the position fix is inconsistent with the non-GNSS position, the received signals as including the spoofing signal.

Clause 35: The mobile device of clause 34 wherein: the one or more processing units comprise an application processor and a processor within a GNSS receiver of the mobile device; and the application processor is configured to: determine the position fix is inconsistent with the non-GNSS position; and based on determining the position fix is inconsistent with the non-GNSS position, provide the processor within the GNSS receiver with information regarding the non-GNSS position, the search window, or both.

Clause 36: The mobile device of clause 31, wherein the one or more processing units, when determining the first GNSS signal to be a spoofing signal, are configured to: identify the first GNSS signal as the spoofing signal based on determining that a location determined from a pseudorange of the first GNSS signal is inconsistent with map data.

Clause 37: The mobile device of clause 31, wherein the one or more processing units, when determining the first GNSS signal to be a spoofing signal, are configured to determine that a difference between a signal frequency of the first GNSS signal and a signal frequency of a previously captured GNSS signal is greater than a threshold value.

Clause 38: The mobile device of clause 31, wherein the one or more processing units, when determining the first GNSS signal to be a spoofing signal, are configured to: obtain two sets of self-consistent signals, wherein one set of the self-consistent signals comprises the first GNSS signal; determine a respective position fix of the mobile device based on each of the two sets of self-consistent signals; and identify, based on a difference between the two respective position fixes, the one set of the self-consistent signals comprising the first GNSS signal as including the spoofing signal.

Clause 39: The mobile device of clause 31, wherein the one or more processing units, when determining the first GNSS signal to be a spoofing signal, are configured to: identify the first GNSS signal as the spoofing signal based on: determining a change of a code phase of the first GNSS signal beyond a threshold change in code phase, determining a change of a frequency of the first GNSS signal beyond a threshold change in frequency, or both.

Clause 40: The mobile device of clause 31, wherein the one or more processing units, when determining the first GNSS signal to be a spoofing signal, are configured to, are configured to: identify the first GNSS signal as the spoofing signal based on determining rate-of-change of a code phase, a frequency, or both, of the first GNSS signal being different than a previously-determined or predicted rate-of-change beyond a threshold value.

Clause 41: The mobile device of any of clauses 22-40, wherein the first GNSS signal is received by the mobile device via a first frequency or GNSS constellation and the second GNSS signal is received by the mobile device via a second frequency or GNSS constellation.

Clause 42: The mobile device of clause 31, wherein the one or more processing units are configured to determine the first GNSS signal to be a spoofing signal based, at least in part, upon determining that the first GNSS signal is from a first constellation and is inconsistent with a location of the mobile device determined using a second constellation.

Clause 43: An apparatus for determining a mobile device location resistant to Global Navigation Satellite System (GNSS) spoofing, comprising: means for determining a non-GNSS position of the mobile device based on position information from one or more non-GNSS data sources; means for receiving, at the mobile device, a first GNSS signal; means for determining, for a predicted frequency and a predicted code phase based on the non-GNSS position, that the first GNSS signal comprises: a frequency that differs from the predicted frequency by more than a threshold frequency difference, a code phase that differs from the predicted code phase by more than a threshold code phase difference, or both; means for receiving a second GNSS signal within a search window based on the non-GNSS position, the threshold frequency difference, and the threshold code phase difference; and means for determining a measurement for the second GNSS signal.

Clause 44: The apparatus of clause 43, further comprising means for selecting the search window such that the first GNSS signal is outside of the search window.

Clause 45: The apparatus of any of clauses 43-44, wherein the search window is implemented using one or more tracking loops.

Clause 46: The apparatus of any of clauses 43-44, wherein the search window is a part of a two-dimensional tracking grid including different combinations of code phase offsets and signal frequencies.

Clause 47: A non-transitory computer-readable medium storing instructions for determining a mobile device location resistant to Global Navigation Satellite System (GNSS) spoofing, the instructions comprising code for: determining a non-GNSS position of the mobile device based on position information from one or more non-GNSS data sources; receiving a first GNSS signal; determining, for a predicted frequency and a predicted code phase based on the non-GNSS position, that the first GNSS signal comprises: a frequency that differs from the predicted frequency by more than a threshold frequency difference, a code phase that differs from the predicted code phase by more than a threshold code phase difference, or both; receiving a second GNSS signal within a search window based on the non-GNSS position, the threshold frequency difference, and the threshold code phase difference; and determining a measurement for the second GNSS signal.

What is claimed is:

1. A method of determining a mobile device location resistant to Global Navigation Satellite System (GNSS) spoofing, the method comprising:
   determining a non-GNSS position of the mobile device based on position information from one or more non-GNSS data sources;
   receiving, at the mobile device, a first GNSS signal;
   determining, for a predicted frequency and a predicted code phase based on the non-GNSS position, that the first GNSS signal comprises:
      a frequency having a frequency difference with the predicted frequency greater than a first predetermined threshold,
      a code phase having a phase difference with the predicted code phase greater than a second predetermined threshold,
      or both;
   receiving a second GNSS signal within a search window based on the non-GNSS position, the threshold frequency difference, and the threshold code phase difference; and
   determining a measurement for the second GNSS signal.

2. The method of claim 1, wherein the position information from one or more non-GNSS data sources comprises:
   multi-lateration of the mobile device based at least in part on signals from terrestrial transceivers,
   Wide Area Network (WAN) cell sector center,
   Access Point (AP) location,
   map data,
   sensor data, or
   dead reckoning positioning information, or
   a combination thereof.

3. The method of claim 2, wherein the sensor data comprises data from:
a motion sensor,
a magnetometer,
a wheel sensor,
a camera,
a radar,
a LIDAR, or
a sonar sensor,
or combination thereof.

4. The method of claim 1, further comprising receiving the non-GNSS position at a GNSS receiver of the mobile device from an application processor of the mobile device.

5. The method of claim 4, wherein the non-GNSS position is based on a previous position estimation for the mobile device.

6. The method of claim 1, further comprising selecting the search window such that the first GNSS signal is outside of the search window.

7. The method of claim 1, wherein the search window is implemented using one or more tracking loops.

8. The method of claim 1, wherein the search window is a part of a two-dimensional tracking grid including different combinations of code phase offsets and signal frequencies.

9. The method of claim 1, further comprising determining an updated position of the mobile device based on the measurement for the second GNSS signal.

10. The method of claim 1, further comprising determining the first GNSS signal to be a spoofing signal.

11. The method of claim 10, wherein determining the first GNSS signal to be a spoofing signal is based, at least in part, on the spoofing signal having a signal strength greater than a threshold value.

12. The method of claim 11, wherein the threshold value is determined based on a GNSS signal strength level in open sky condition.

13. The method of claim 10, wherein further comprising subtracting the spoofing signal from a plurality of received signals to receive the second GNSS signal.

14. The method of claim 10, wherein determining the first GNSS signal to be a spoofing signal comprises:
determining a position fix of the mobile device based on received signals comprising the first GNSS signal and additional GNSS signals from a plurality of GNSS satellites; and
identifying, based on determining that the position fix is inconsistent with the non-GNSS position, the received signals as including the spoofing signal.

15. The method of claim 10, wherein determining the first GNSS signal to be a spoofing signal comprises:
identifying the first GNSS signal as the spoofing signal based on determining that a location determined from a pseudorange of the first GNSS signal is inconsistent with map data.

16. The method of claim 10, wherein determining the first GNSS signal to be a spoofing signal comprises:
determining that a difference between a signal frequency of the first GNSS signal and a signal frequency of a previously captured GNSS signal is greater than the first predetermined threshold.

17. The method of claim 10, wherein determining the first GNSS signal to be a spoofing signal comprises:
obtaining two sets of self-consistent signals, wherein one set of the self-consistent signals comprises the first GNSS signal;
determining a respective position fix of the mobile device based on each of the two sets of self-consistent signals; and
identifying, based on a difference between the two respective position fixes, the one set of the self-consistent signals comprising the first GNSS signal as including the spoofing signal.

18. The method of claim 10, wherein determining the first GNSS signal to be a spoofing signal comprises:
identifying the first GNSS signal as the spoofing signal based on:
determining a change of a code phase of the first GNSS signal greater than the second predetermined threshold,
determining a change of a frequency of the first GNSS signal greater than the first predetermined threshold,
or both.

19. The method of claim 10, wherein determining the first GNSS signal to be a spoofing signal comprises:
acquiring the first GNSS signal; and
identifying the first GNSS signal as the spoofing signal based on determining rate-of-change of a code phase, a frequency, or both, of the first GNSS signal being different than a previously-determined or predicted rate-of-change beyond a threshold value.

20. The method of claim 10, wherein determining the first GNSS signal to be a spoofing signal is based, at least in part, upon determining that the first GNSS signal is from a first constellation and is inconsistent with a location of the mobile device determined using a second constellation.

21. The method of claim 1, wherein the first GNSS signal is received by the mobile device via a first frequency or GNSS constellation and the second GNSS signal is received by the mobile device via a second frequency or GNSS constellation.

22. A mobile device for determining a location resistant to Global Navigation Satellite System (GNSS) spoofing, the mobile device comprising:
an antenna configured to receive GNSS signals;
a memory; and
one or more processing units communicatively coupled with the antenna and the memory, wherein the one or more processing units are configured to:
determine a non-GNSS position of the mobile device based on position information from one or more non-GNSS data sources;
receive, via the antenna, a first GNSS signal;
determine, for a predicted frequency and a predicted code phase based on the non-GNSS position, that the first GNSS signal comprises:
a frequency having a frequency difference with the predicted frequency greater than a first predetermined threshold,
a code phase having a phase difference with the predicted code phase greater than a second predetermined threshold,
or both;
receive, via the antenna, a second GNSS signal within a search window based on the non-GNSS position, the threshold frequency difference, and the threshold code phase difference; and
determine a measurement for the second GNSS signal.

23. The mobile device of claim 22, wherein the position information from one or more non-GNSS data sources comprises:
multi-lateration of the mobile device based at least in part on signals from terrestrial transceivers, Wide Area Network (WAN) cell sector center,
Access Point (AP) location,
map data,
sensor data, or
dead reckoning positioning information, or
a combination thereof.

24. The mobile device of claim 23, wherein the sensor data comprises data from:
a motion sensor,
a magnetometer,
a wheel sensor,
a camera,
a radar,
a LIDAR, or
a sonar sensor,
or combination thereof.

25. The mobile device of claim 22, wherein:
the one or more processing units comprise an application processor and a processor within a GNSS receiver of the mobile device; and
the processor within a GNSS receiver of the mobile device is configured to receive the non-GNSS position from the application processor.

26. The mobile device of claim 25, wherein the application processor is configured to execute a positioning engine, and wherein the non-GNSS position is determined using the positioning engine.

27. The mobile device of claim 22, wherein the one or more processing units are further configured to select the search window such that the first GNSS signal is outside of the search window.

28. The mobile device of claim 22, wherein the search window is implemented using one or more tracking loops.

29. The mobile device of claim 22, wherein the search window is a part of a two-dimensional tracking grid including different combinations of code phase offsets and signal frequencies.

30. The mobile device of claim 22, wherein the one or more processing units are further configured to determine an updated position of the mobile device based on the measurement for the second GNSS signal.

31. The mobile device of claim 22, wherein the one or more processing units are further configured to determine the first GNSS signal to be a spoofing signal.

32. The mobile device of claim 31, wherein the one or more processing units are configured determine the first GNSS signal to be a spoofing signal based, at least in part, on the spoofing signal having a signal strength greater than a threshold value.

33. The mobile device of claim 31, wherein the one or more processing units are further configured to subtract the spoofing signal from a plurality of received signals to receive the second GNSS signal.

34. The mobile device of claim 31, wherein the one or more processing units, when determining the first GNSS signal to be a spoofing signal, are configured to:
determine a position fix of the mobile device based on received signals comprising the first GNSS signal and additional GNSS signals from a plurality of GNSS satellites; and
identify, based on determining that the position fix is inconsistent with the non-GNSS position, the received signals as including the spoofing signal.

35. The mobile device of claim 34, wherein:
the one or more processing units comprise an application processor and a processor within a GNSS receiver of the mobile device; and
the application processor is configured to:
determine the position fix is inconsistent with the non-GNSS position; and
based on determining the position fix is inconsistent with the non-GNSS position, provide the processor within the GNSS receiver with information regarding the non-GNSS position, the search window, or both.

36. The mobile device of claim 31, wherein the one or more processing units, when determining the first GNSS signal to be a spoofing signal, are configured to:
identify the first GNSS signal as the spoofing signal based on determining that a location determined from a pseudorange of the first GNSS signal is inconsistent with map data.

37. The mobile device of claim 31, wherein the one or more processing units, when determining the first GNSS signal to be a spoofing signal, are configured to determine that a difference between a signal frequency of the first GNSS signal and a signal frequency of a previously captured GNSS signal is greater than the first predetermined threshold.

38. The mobile device of claim 31, wherein the one or more processing units, when determining the first GNSS signal to be a spoofing signal, are configured to:
obtain two sets of self-consistent signals, wherein one set of the self-consistent signals comprises the first GNSS signal;
determine a respective position fix of the mobile device based on each of the two sets of self-consistent signals; and
identify, based on a difference between the two respective position fixes, the one set of the self-consistent signals comprising the first GNSS signal as including the spoofing signal.

39. The mobile device of claim 31, wherein the one or more processing units, when determining the first GNSS signal to be a spoofing signal, are configured to:
identify the first GNSS signal as the spoofing signal based on:
determining a change of a code phase of the first GNSS signal greater than the second predetermined threshold,
determining a change of a frequency of the first GNSS signal greater than the first predetermined threshold, or both.

40. The mobile device of claim 31, wherein the one or more processing units, when determining the first GNSS signal to be a spoofing signal, are configured to:
identify the first GNSS signal as the spoofing signal based on determining rate-of-change of a code phase, a frequency, or both, of the first GNSS signal being different than a previously-determined or predicted rate-of-change beyond a threshold value.

41. The mobile device of claim 31, wherein the one or more processing units are configured to determine the first GNSS signal to be a spoofing signal based, at least in part, upon determining that the first GNSS signal is from a first constellation and is inconsistent with a location of the mobile device determined using a second constellation.

42. The mobile device of claim 22, wherein the first GNSS signal is received by the mobile device via a first frequency or GNSS constellation and the second GNSS signal is received by the mobile device via a second frequency or GNSS constellation.

43. An apparatus for determining a mobile device location resistant to Global Navigation Satellite System (GNSS) spoofing, the apparatus comprising:
   means for determining a non-GNSS position of the mobile device based on position information from one or more non-GNSS data sources;
   means for receiving, at the mobile device, a first GNSS signal;
   means for determining, for a predicted frequency and a predicted code phase based on the non-GNSS position, that the first GNSS signal comprises:
      a frequency having a frequency difference with the predicted frequency greater than a first predetermined threshold,
      a code phase having a phase difference with the predicted code phase greater than a second predetermined threshold,
      or both;
   means for receiving a second GNSS signal within a search window based on the non-GNSS position, the threshold frequency difference, and the threshold code phase difference; and
   means for determining a measurement for the second GNSS signal.

44. The apparatus of claim 43, further comprising means for selecting the search window such that the first GNSS signal is outside of the search window.

45. The apparatus of claim 43, wherein the search window is implemented using one or more tracking loops.

46. The apparatus of claim 43, wherein the search window is a part of a two-dimensional tracking grid including different combinations of code phase offsets and signal frequencies.

47. A non-transitory computer-readable medium storing instructions for determining a mobile device location resistant to Global Navigation Satellite System (GNSS) spoofing, the instructions comprising code for:
   determining a non-GNSS position of the mobile device based on position information from one or more non-GNSS data sources;
   receiving a first GNSS signal;
   determining, for a predicted frequency and a predicted code phase based on the non-GNSS position, that the first GNSS signal comprises:
      a frequency having a frequency difference with the predicted frequency greater than a first predetermined threshold,
      a code phase having a phase difference with the predicted code phase greater than a second predetermined threshold,
      or both;
   receiving a second GNSS signal within a search window based on the non-GNSS position, the threshold frequency difference, and the threshold code phase difference; and
   determining a measurement for the second GNSS signal.

* * * * *